United States Patent
Lu et al.

(10) Patent No.: US 11,449,046 B2
(45) Date of Patent: Sep. 20, 2022

(54) MODEL-PLANT MISMATCH DETECTION WITH SUPPORT VECTOR MACHINE FOR CROSS-DIRECTIONAL PROCESS BEHAVIOR MONITORING

(71) Applicant: Honeywell Limited, Mississauga (CA)

(72) Inventors: Qiugang Lu, Vancouver (CA); R. Bhushan Gopaluni, Vancouver (CA); Michael G. Forbes, North Vancouver (CA); Philip D. Loewen, North Vancouver (CA); Johan U. Backstrom, North Vancouver (CA); Guy A. Dumont, Vancouver (CA)

(73) Assignee: Honeywell Limited, Ontario (CA)

( * ) Notice: Subject to any disclaimer, the term of this patent is extended or adjusted under 35 U.S.C. 154(b) by 1136 days.

(21) Appl. No.: 15/611,082

(22) Filed: Jun. 1, 2017

(65) Prior Publication Data
US 2018/0081349 A1  Mar. 22, 2018

Related U.S. Application Data

(60) Provisional application No. 62/395,950, filed on Sep. 16, 2016.

(51) Int. Cl.
G05B 23/02 (2006.01)
G05B 17/02 (2006.01)
(Continued)

(52) U.S. Cl.
CPC ......... *G05B 23/0243* (2013.01); *G05B 17/02* (2013.01); *G05B 23/0254* (2013.01);
(Continued)

(58) Field of Classification Search
CPC ........ G06N 20/00; G06N 20/10; G06N 20/20; G05B 23/0243; G05B 23/0254; G05B 17/02
See application file for complete search history.

(56) References Cited

U.S. PATENT DOCUMENTS 5,351,184 A  9/1994 Lu et al.
5,561,599 A  10/1996 Lu
(Continued)

FOREIGN PATENT DOCUMENTS

CN  102985884 A  3/2013
WO  2008139006 A1  11/2008
WO  2010138452 A1  12/2010

OTHER PUBLICATIONS

Carino et al., "Novelty Detection Methodology based on Multi-Modal One-class Support Vector Machine", 1-4 Sep. 2015, IEEE, pp. 185-190 (Year: 2015).*

(Continued)

*Primary Examiner* — Benjamin P Geib
(74) *Attorney, Agent, or Firm* — Paschall & Associates, LLC; James C. Paschall

(57) ABSTRACT

A method includes obtaining operating data associated with operation of a cross-directional industrial process controlled by at least one model-based process controller. The method also includes, during a training period, performing closed-loop model identification with a first portion of the operating data to identify multiple sets of first spatial and temporal models. The method further includes identifying clusters associated with parameter values of the first spatial and temporal models. The method also includes, during a testing period, performing closed-loop model identification with a second portion of the operating data to identify second spatial and temporal models. The method further includes determining whether at least one parameter value of at least one of the second spatial and temporal models falls outside at least one of the clusters. In addition, the method includes, in response to such a determination, detecting that a mismatch exists between actual and modeled behaviors of the industrial process.

17 Claims, 6 Drawing Sheets

(51) Int. Cl.
*G06N 20/10* (2019.01)
*G05B 13/04* (2006.01)
(52) U.S. Cl.
CPC ............ *G06N 20/10* (2019.01); *G05B 13/04* (2013.01); *G05B 13/041* (2013.01); *G05B 13/048* (2013.01); *G05B 2219/25298* (2013.01)

(56) References Cited

U.S. PATENT DOCUMENTS

| | | | |
|---|---|---|---|
| 5,572,420 | A | 11/1996 | Lu |
| 5,574,638 | A | 11/1996 | Lu |
| 5,758,047 | A | 5/1998 | Lu et al. |
| 6,055,483 | A | 4/2000 | Lu |
| 6,122,555 | A | 9/2000 | Lu |
| 6,253,113 | B1 | 6/2001 | Lu |
| 6,381,504 | B1 * | 4/2002 | Havener ............ G05B 13/048 700/28 |
| 6,697,767 | B2 | 2/2004 | Wang et al. |
| 2002/0111758 | A1 | 8/2002 | Wang et al. |
| 2003/0139828 | A1 * | 7/2003 | Ferguson ............ G06K 9/6269 700/53 |
| 2005/0096866 | A1 * | 5/2005 | Shan .................. G06F 11/0751 702/179 |
| 2007/0078529 | A1 | 4/2007 | Thiele et al. |
| 2007/0100476 | A1 * | 5/2007 | Fan ...................... G05B 13/042 700/31 |
| 2007/0239629 | A1 * | 10/2007 | Ling .................... G05B 23/024 706/12 |
| 2008/0243289 | A1 * | 10/2008 | Yelchuru ................ G05B 17/02 700/109 |
| 2009/0198350 | A1 * | 8/2009 | Thiele .................... G05B 17/02 700/30 |
| 2009/0204233 | A1 | 8/2009 | Zhan et al. |
| 2010/0204808 | A1 * | 8/2010 | Thiele .................... G05B 17/02 700/30 |
| 2010/0205124 | A1 | 8/2010 | Ben-Hur et al. |
| 2011/0130850 | A1 | 6/2011 | Zheng et al. |
| 2013/0318011 | A1 * | 11/2013 | Jones ...................... G05B 23/02 706/12 |
| 2014/0129491 | A1 * | 5/2014 | Sayyar-Rodsari ...... G06F 17/10 706/12 |
| 2014/0358254 | A1 | 12/2014 | Chu et al. |
| 2015/0112900 | A1 * | 4/2015 | Ariyoshi ................ G06N 20/00 706/12 |
| 2015/0268645 | A1 | 9/2015 | Shi et al. |
| 2015/0356421 | A1 * | 12/2015 | Jones ...................... G06N 20/00 706/12 |
| 2016/0357162 | A1 | 12/2016 | He et al. |
| 2017/0147941 | A1 * | 5/2017 | Bauer .................... G06N 20/10 |
| 2018/0059656 | A1 * | 3/2018 | Hiruta ................ G05B 23/0243 |

OTHER PUBLICATIONS

Huang et al., "Novel Clustering Algorithm based on One-Class SVM", 2009, Global Congress on Intelligent Systems (Year: 2009).*
Widodo et al., "Support vector machine in machine condition monitoring and fault diagnosis", Mechanical Systems and Signal Processing 21 (Jan. 12, 2007) (Year: 2007).*
Lu et al., "Cross-Directional Controller Performance Monitoring for Paper Machines", Jul. 1-3, 2015, American Control Conference 2015, p. 4970-4975 (Year: 2015).*
Chen et al., "Closed-Loop Subspace Projection Based State-Space Model-Plant Mismatch Detection and Isolation for MIMO MPC Performance Monitoring", Dec. 10-13, 2013, IEEE, 52nd IEEE Conference on Decision and Control, p. 6143-6148 (Year: 2013).*
Ji, Guoli, Kangkang Zhang, and Yucai Zhu. "A method of MPC model error detection." Journal of Process Control 22.3 (2012): 635-642. (Year: 2012).*
Babji et al., "Time-Delay Estimation in Closed-Loop Processes Using Average Mutual Information Theory", Control and Intelligent Systems, vol. 37, No. 3, 2009, 7 pages.
Badwe et al., "Closed-loop identification using direct approach and high order ARX/GOBF-ARX models", Journal of Process Control 21, 2011, 16 pages.
Bjorklund et al., "A Review of Time-Delay Estimation Techniques", Proceedings of the 42nd IEEE Conference on Decision and Control, Dec. 2003, 6 pages.
Esmaili et al., "Direct and two-step methods for closed-loop identification: a comparison of asymptotic and finite data set performance", Journal of Process Control 10, 2000, 13 pages.
Forssell et al., "A Projection Method for Closed-Loop Identification", IEEE Transactions on Automatic Control, vol. 45, No. 11, Nov. 2000, 6 pages.
Gevers et al., "Asymptotic variance expressions for closed-loop identification", Automatica 37, 2001, 6 pages.
Gustavsson et al., "Survey Paper—Identification of Processes in Closed Loop—Identifiability and Accuracy Aspects", Automatica, vol. 13, 1977, 17 pages.
Lee et al., "On Some Key Issues in the Windsurfer Approach to Adaptive Robust Control", Automatica, vol. 31, No. 11, 1995, 18 pages.
Van Den Hof et al., "An Indirect Method for Transfer Function Estimation from Closed Loop Data*", Automatica, vol. 29, No. 6, 1993, 5 pages.
Wang et al., "Closed-loop identification via output fast sampling", Journal of Process Control 14, 2004, 16 pages.
Huynh, "A Modified Shuffled Frog Leaping Algorithm for Optimal Tuning of Multivariable PID Controllers", IEEE International Conference on Industrial Technology, Apr. 2008, pp. 1-6.
Biagiola et al., "Identification of Uncertain MIMO Wiener and Hammerstein Models", Computers and Chemical Engineering, Jun. 2011, vol. 35(12), 9 pages.
Maciejowski, "Predictive Control with Constraints", Pearson Education Limited, 2002, 6 pages.
Maciejowski, "Predictive Control with Constraints: Section 7.5 Reference trajectory and pre-filter", Prentice Hall, 2002, pp. 211-214.
Skogestad et al., "Multivariable Feedback Control: Analysis and Design", John Wiley & Sons, 1996, 8 pages.
Chu et al., "Model Predictive Control and Optimization for Papermaking Processes", Advanced Model Predictive Control, Jul. 2011, pp. 309-342.
Fan et al., "Two-Dimensional Frequency Response Analysis and Insights for Weight Selection in Cross-Directional Model Predictive Control", Proceedings from 42nd IEEE, Dec. 2003, 7 pages.
Garriga et al., "Model Predictive Controller Tuning via Eigenvalue Placement", 2008 American Control Conference, Jun. 2008, 6 pages.
Garriga et al., "Model Predictive Control Tuning Methods: A Review", American Chemical Society, Mar. 2010, pp. 3505-3515.
Mohtadi et al., "Frequency response characteristics of MIMO GPC", Int. J. Control, vol. 55, No. 4, 1992, 24 pages.
Rowe et al., "Tuning MPC using H∞ Loop Shaping", Proceedings of the American Control Conference, Jun. 2000, 5 pages.
Shah et al., "Tuning MPC for Desired Closed-Loop Performance for MIMO Systems", American Control Conference, Jun.-Jul. 2011, pp. 4404-4409.
DiCairano et al., "Model Predictive Control Tuning by Controller Matching", IEEE Transactions on Automatic Control, vol. 55, No. 1, Jan. 2010, pp. 185-190.
Kong et al., "Predictive metamorphic control", Automatica 49, 2013, pp. 3670-3676.
Angeli et al., "An ellipsoidal off-line MPC scheme for uncertain polytopic discrete-time systems", Automatica 44, 2008, pp. 3113-3119.
Vlassis et al., "Polytopic uncertainty for linear systems: New and old complexity results", Luxembourg Centre for Systems Biomedicine, Feb. 2014; 13 pages.
He et al., "User Friendly Robust MPC Tuning of Uncertain Paper-Making Processes", Department of Electrical and Computer Engineering, University of Alberta, Feb. 2015, 6 pages.
Hu et al., "Systematic H∞ weighting function selection and its application to the real-time control of a vertical take-off aircraft", Control Engineering Practice, vol. 8, 2000, pp. 241-252.

(56) References Cited

OTHER PUBLICATIONS

Bazaraa et al., "Nonlinear Programming: Theory and Algorithms", John Wiley & Sons, 1979, 3 pages.
Zhou et al., "Essentials of Robust Control: Chapter 9 Linear Fractional Transformation", Prentice Hall, 1998, 3 pages.
U.S. Appl. No. 14/314,221 entitled "Method and Apparatus for Specifying and Visualizing Robust Tuning of Model-Based Controllers" filed Jun. 25, 2014, 49 pages.
International Search Report dated Jun. 9, 2015 in connection with International Application No. PCT/CA2015/000146, 3 pages.
Written Opinion of the International Searching Authority dated Jun. 9, 2015 in connection with International Application No. PCT/CA2015/000146, 4 pages.
International Search Report and Written Opinion of the International Searching Authority dated Jun. 22, 2016 in connection with International Application No. PCT/CA2016/000153, 9 pages.
U.S. Appl. No. 15/636,347 entitled "Model-Plant Mismatch Detection Using Model Parameter Data Clustering for Paper Machines or Other Systems" filed on Jun. 28, 2017, 44 pages.
U.S. Appl. No. 15/636,419 entitled "Closed-Loop Model Parameter Identification Techniques for Industrial Model-Based Process Controllers" filed on Jun. 28, 2017, 37 pages.
Sun, Zhijie, et al., "Performance monitoring of model-predictive controllers via model residual assessment," Journal of Process Control, No. 23, 2013, pp. 473-482.
Suykens, J.A.K., et al., "Least Squares Support Vector Machine Classifiers," Neural Processing Letters, No. 9, 1999, pp. 293-300.
Taylor, A.R., et al., "Bayesian Methods for Control Loop Performance Assessment in Cross-Directional Control," Department of Engineering, University of Oxford, UK, Jan. 2005, 6 pages.
Thornhill, N.F., et al., "Refinery-wide control loop performance assessment," Journal of Process Control, No. 9, 1999, pp. 109-124.
Duncan, "The cross directional control of a web forming process," Ph.D thesis, University of London, 1989, 137 pages.
Zarrop, "Optimal experiment design for dynamic system identification," Ph.D thesis, Imperial College London (University of London), 1977, 180 pages.
Vanantwerp, Jeremy G., et al., "Cross-directional control of sheet and film processes," ScienceDirect, Automatica, No. 43, 2007, pp. 191-211.
Wang, Siyun, et al., "Autocovariance-Based MPC Model Mismatch Estimation for SISO Systems," 2015 IEEE 54th Annual Conference on Decision and Control (CDC), Osaka, Japan, Dec. 15-18, 2015, pp. 3032-3037.
Yerramilli, Suraj, et al., "Detection and diagnosis of model-plant mismatch in MIMO systems using plant-model ratio," ScienceDirect, IFAC-PapersOnLine 49-1, 2016, pp. 266-271.
Zhu, Yucai, et al., "The Box-Jenkins Steiglitz-McBride algorithm," Automatica, No. 65, 2016, pp. 170-182.
U.S. Appl. No. 15/636,419, filed Jun. 28, 2017, entitled "Closed-Loop Model Parameter Identification Techniques for Industrial Model-Based Process Controllers."
U.S. Appl. No. 15/636,347, filed Jun. 28, 2017, entitled "Model-Plant Mismatch Detection Using Model Parameter Data Clustering for Paper Machines or Other Systems."
Badwe, Abhijit, et al., "Quantifying the impact of model-plant mismatch on controller performance," Journal of Process Control, No. 20, 2010, pp. 408-425.
Badwe, Abhijit, et al., "Detection of model-plant mismatch in MPC applications," Journal of Process Control, No. 19, 2009, pp. 1305-1313.
Bombois, Xavier, et al., "Identification for robust H2 deconvolution filtering," Automatica, No. 46, 2010, pp. 577-584.
Botelho, Viviane, et al., "Perspectives and Challenges in Performance Assessment of Model Predictive Control," The Canadian Journal of Chemical Engineering, vol. 94, Jul. 2016, pp. 1225-1241.
Boyd, Stephen, et al., "Linear Matrix Inequalities in System and Control Theory," Society for Industrial and Applied Mathematics, Philadelphia, PA, 1994, 205 pages.
Chu, Danlei, et al., "Online CD Performance Monitoring and Automatic Alignment Correction," Honeywell Process Solutions, North Vancouver, BC, Canada, PaperCon 2011, pp. 945-955.
Desborough, Lane, et al., "Performance Assessment Measures for Univariate Feedback Control," The Canadian Journal of Chemical Engineering, vol. 70, Dec. 1992, pp. 1186-1197.
Duncan, Stephen R., et al., "Evaluating the Performance of Cross-Directional Control Systems," Proceedings of the American Control Conference, San Diego, CA, Jun. 1999, pp. 3092-3096.
Duncan, Stephen, et al., "Performance Monitoring for Cross-Directional Control Systems," Control Systems 2000, pp. 173-177.
Fan, Junqiang, "Model Predictive Control for Multiple Cross-Directional Processes: Analysis, Tuning, and Implementation," Doctoral Thesis, Department of Electrical and Computer Engineering, University of British Columbia, Sep. 2003, 172 pages.
Featherstone, Andrew, et al., "Identification and Control of Sheet and Film Processes," Advances in Industrial Control, Springer-Verlag London Ltd., 2000, 23 pages.
Forssell, Urban, et al., "Closed-loop identification revisited," Automatica, No. 35, 1999, pp. 1215-1241.
Forssell, Urban, "Closed-loop Identification Methods, Theory, and Applications," Linkoping Studies in Science and Technology, Dissertations, No. 566, Department of Electrical Engienering, Linkoping University, Linkoping, Sweden, 1999, 263 pages.
Fukushima, Hiroaki, et al, "Adaptive model predictive control for a class of constrained linear systems based on the comparison model," Automatica, No. 43, 2007, pp. 301-308.
Gevers, Michel, et al., "Optimal Experiment Design for Open and Closed-Loop System Identification," research results from the Belgian Programme on Interuniversity Attraction Poles, Belgian Federal Science Policy Office, Jan. 2011, 24 pages.
Gevers, Michel, et al., "Optimal Experiment Designs with Respect to the Intended Model Application," Automatica, vol. 22, No. 5, 1986, pp. 543-554.
Gevers, Michel, et al., "Identification and the Information Matrix: How to Get Just Sufficiently Rich?," IEEE Transactions on Automatic Control, vol. 54, No. 12, Dec. 2009, pp. 2828-2840.
Goowdin, Graham C., et al., Dynamic System, Identifications: Experiment Design and Data Analysis, Mathematics in Science and Engineering, vol. 136, Academic Press, 1977, 56 pages.
Gopaluni, R. Bhushan, et al., "Identification of Symmetric Noncasual Processes: Cross-Directional Response Modelling of Papers Machines," Proceedings of the 45th IEEE Conference on Decision & Control, San Diego, CA, Dec. 13-15, 2006, pp. 6744-6749.
Gorinevsky, Dimitry M., et al., "Identification Tool for Cross-Directional Processes," IEEE Transactions on Control Systems Technology, vol. 11, No. 5, Sep. 2003, pp. 629-640.
Grimble, M.J., "Generalized Minimum Variance Control Law Revisited," Optimal Control Applications & Methods, vol. 9, 1988, pp. 63-77.
Grimble, M.J., et al., "Weighting Selection for Controller Benchmarking and Tuning," IST-2000-29239 PAM, Performance Assessment and Benchmarking of Controls, 2001-2004, ICC/219/Dec. 2004, PAM Document Code: PAM-12-TN-1-V1, Industrial Control Centre, University of Strathclyde, UK, Dec. 6, 2004, 15 pages.
Harris, Thomas J., "Assessment of Control Loop Performance," The Canadian Journal of Chemical Engineering, vol. 67, Oct. 1989, pp. 856-861.
Harris, T. J., et al., "Performance Assessment of Multivariable Feedback Controllers," Automatica, vol. 32, No. 11, 1996, pp. 1505-1518.
Harris, T. J., et al., "A review of performance monitoring and assessment techniques for univariate and multivariate control systems," Journal of Process Control 9, 1999, pp. 1-17.
Harrison, Christopher A., et al., "Discriminating between disturbance and process model mismatch in model predictive control," Journal of Process Control, No. 19, 2009, pp. 1610-1616.
Hjalmarsson, Hakan, et al., "For Model-based Control Design, Closed-loop Identification Gives Better Performance," Automatica, vol. 32, No. 12, 1996, pp. 1659-1673.
Honeywell, "Experion MX Color Control," Product Information Note, Model Q5976-51, 52, and 53, Automation & Control Solutions, Process Solutions, May 2011, 5 pages.

(56) References Cited

OTHER PUBLICATIONS

Honeywell, "Experion MX Color Shade Change Control," Product Information Note, Model Q5979-50, Automation & Control Solutions, Process Solutions, May 2011, 4 pages.

Honeywell, "Experion MX Machine Direction Controls," Product Information Note, Automation & Control Solutions, Process Solutions, May 2011, 3 pages.

Honeywell, "Honeywell Process Solutions," White Paper, Experion MX—Quality Control System Delivers Lowest Total Cost of Ownership, Automation & Control Solutions, Process Solutions, Sep. 2010, 8 pages.

Huang, Biao, et al., "Performance Assessment of Control Loops, Theory and Applications," Advances in Industrial Control, Springer-Verlag London Ltd., 1962, 16 pages.

Huang, Biao, et al., "On-Line Control Performance Monitoring of Mimo Processes," WP9-3:50, Proceedings of the American Control Conference, Seattle, Washington, Jun. 1995, pp. 1250-1254.

Huang, Biao, et al., "Performance Assessment of Multivariate Control Loops on a Paper-Machine Headbox," The Canadian Journal of Chemical Engineering, vol. 75, Feb. 1997, pp. 134-142.

Jansson, Henrik, et al., "Input Design via LMIs Admitting Frequency-Wise Model Specifications in Confidence Regions," IEEE Transactions on Automatic Control, vol. 50, No. 10, Oct. 2005, pp. 1534-1549.

Jansson, Henrik, "Experiment Design with Applications in Identification for Control," Doctoral Thesis, Automatic Control, Department of Signals, Sensors and Systems, Royal Institute of Technology, Stockholm, Sweden, 2004, 217 pages.

Jelali, Mohieddine, "Control Performance Management in Industrial Automation, Assessment, Diagnosis and Improvement of Control Loop Performance," Advances in Industrial Control, Springer-Verlag London, 2013, 32 pages.

Ko, Byung-Su, et al., "Performance Assessment of Constrained Model Predictive Control Systems," Process Systems Engineering, AIChE Journal, vol. 47, No. 6, Jun. 2001, pp. 1363-1371.

Li, Q., et al., "A relative performance monitor for process controllers," International Journal of Adaptive Control and Signal Processing, No. 17, 2003, pp. 685-708.

Ljung, Lennart, "System Identification Theory for the User, Second Edition," Linkoping University, Sweden, Prentice Hall PTR, New Jersey, 1999, 129 pages.

Ljung, Lennart, et al., "Asymptotic Properties of Black-Box Identification of Transfer Functions," IEEE Transactions on Automatic Control, vol. AC-30, No. 6, Jun. 1985, pp. 514-530.

Ljung, Lennart, "Asymptotic Variance Expressions for Identified Black-Box Transfer Function Models," IEEE Transactions on Automatic Control, vol. AC-30, No. 9, Sep. 1985, pp. 834-844.

Lynch, C.B., et al., "Control Loop Performance Monitoring," IEEE Transactions on Control Systems Technology, vol. 4, No. 2, Mar. 1996, pp. 185-192.

Mehra, Raman K., "Optimal Input Signals for Parameter Estimation in Dynamic Systems—Survey and New Results," IEEE Transactions on Automatic Control, vol. AC-19, No. 6, Dec. 1974, pp. 753-768.

Ordys, Andnzej W., et al., "Process Control Performance Assessment From Theory to Implementation" Advances in Industrial Control, Springer-Verlag London Limited, 2007, 53 pages.

Qin, S. Joe, "Control performance monitoring—a review and assessment," Computers and Chemical Engineering, No. 23, 1998, pp. 173-186.

Roweis, Sam T., et al., "Nonlinear Dimensionality Reduction by Locally Linear Embedding," Science, vol. 290, Dec. 22, 2000, www.sciencemag.org, pp. 2323-2326.

Scholkopf, Bernhard, et al., "Estimating the Support of a High-Dimensional Distribution," Massachusetts Institute of Technology, Neural Computation No. 13, 2001, pp. 1443-1471.

Shardt, Yuri A.W., et al., "Closed-loop identification with routine operating data: Effect of time delay and sampling time," Journal of Process Control, No. 21, 2011, pp. 997-1010.

Stewart, Gregory Edward, "Two Dimensional Loop Shaping Controller Design for Paper Machine Cross-Directional Processes," Doctoral Thesis, Department of Electrical and Computer Engineering, The University of British Columbia, Aug. 2000, 143 pages.

Bai, Er-Wei, et al., "Convergence of the Iterative Hammerstein System Identification Algorithm," IEEE Transactions an Automatic Control, vol. 49, No. 11, Nov. 2004, pp. 1929-1940.

Bemporad, Alberto, et al., "The explicit linear quadratic regulator for constrained systems," Automatica, No. 38, 2002, pp. 3-20.

Bergh, Luis G., et al., "Spatial Control of Sheet and Film Forming Processes," The Canadian Journal of Chemical Engineering, vol. 65, Feb. 1987, pp. 148-155.

Cortes, Corinna, et al., "Support-Vector Networks," Machine Learning, No. 20, 1995, pp. 273-297.

Giri, Fouad, et al., "Block-Oriented Nonlinear System Identification," Lecture Notes in Control and Information Sciences, Springer-Verlag, 2010, 11 pages.

Golub, Gene, et al., "Separable non-linear least squares: the variable projection method and its applications," Institute of Physics Publishing, Inverse Problems, No. 19, Feb. 14, 2003, 26 pages.

Golub, Gene, et al., "The Differentiation of Pseudo-Inverses and Nonlinear Least Squares Problems Whose Variables Separate," SIAM Journal of Numerical Analysis, vol. 10, No. 2, Apr. 1973, pp. 413-432.

Julien, Rhonda H., et al., "Performance assessment using a model predictive control benchmark," Journal of Process Control, No. 14, 2004, pp. 441-456.

Ljung, Lennart, "Convergence Analysis of Parametric Identification Methods," IEEE Transactions on Automatic Control, vol. AC-23, No. 5, Oct. 1978, pp. 770-783.

Ljung, Lennart, et al., "Asymptotic Properties of the Least-Squares Method for Estimating Transfer Functions and Disturbance Spectra," Advances in Applied Probability, No. 24, 1992, pp. 412-440.

Lu, Qiugang, et al., "Performance Assessment of Cross-Directional Control for Paper Machines," IEEE Transactions on Control Systems Technology, vol. 25, No. 1, Jan. 2017, pp. 208-221.

Mahata, Kaushik, et al., "Large Sample Properties of Separable Nonlinear Least Squares Estimators," IEEE Transaction on Signal Processing, vol. 52, No. 6, Jun. 2004, pp. 1650-1658.

Morales, Rafael, M., et al., "The Robustness and Design of Constrained Cross-Directional Control via Integral Quadratic Constraints," IEEE Transactions on Control Systems Technology, vol. 19, No. 6, Nov. 2011, pp. 1421-1432.

Narendra, K. S., et al., "An Iterative Method for the Identification of Nonlinear Systems Using a Hammerstein Model," IEEE Transactions on Automatic Control, Jul. 1966, pp. 546-550.

Olivier, Laurentz E., et al., "Model-Plant mismatch detection and model update for a run-of-mine ore milling circuit under model predictive control," Journal of Process Control, No. 23, 2013, pp. 100-107.

Qin, S. Joe, et al., "A survey of industrial model predictive control technology," Control Engineering Practice, No. 11, 2003, pp. 733-764.

Rawlings, James B., et al., "Gage Control of Film and Sheet-Forming Processes," American Institute of Chemical Engineers Journal, vol. 42, No. 3, Mar. 1996, pp. 753-766.

Rigopoulos, Apostolos, et al., "Identification of Full Profile Disturbance Models for Sheet Forming Processes," American Institute of Chemical Engineers Journal, vol. 43, No. 3, 1997, pp. 727-739.

Scholkopf, Bernhard, et al., "Estimating the Support of a High-Dimensional Distribution," Massachusetts Institute of Technology, Neural Computation No. 13, 2001, p. 1443-1471.

Shardt, Yuri A.W., et al., "Closed-loop identification condition for ARMAX models using routine operating data," Automatica, No. 47, 2011, pp. 1534-1537.

Soderstrom, Torsten, et al., "System Identification," Prentice Hall, 1989, 43 pages.

Steinwart, Ingo, et al., "Support Vector Machines," Springer Science + Business Media, LLC., 2008, 22 pages.

Stewart, Gregory E., et al., "Feedback Controller Design for a Spatially Distributed System: The Paper Machine Problem," IEEE Transactions on Control Systems Technology, vol. 11, No. 5., Sep. 2003, pp. 612-628.

(56) References Cited

OTHER PUBLICATIONS

Wang, Siyun, et al., "Data-Driven Plant-Model Mismatch Quantification in Input-Constrained Linear MPC," International Federation of Automatic Control, IFAC—PapersOnline 49-7, 2016, pp. 25-30.

Zhu, Yucai, "Estimation of an N-L-N Hammerstein-Wiener Model," 15th Triennial World Congress, Barcelona, Spain, International Federation of Automatic Control, 2002, pp. 247-252.

Office Action for corresponding CN Application No. 201710832698.7 dated Oct. 8, 2021.

* cited by examiner

MODEL-PLANT MISMATCH DETECTION WITH SUPPORT VECTOR MACHINE FOR CROSS-DIRECTIONAL PROCESS BEHAVIOR MONITORING

CROSS-REFERENCE TO RELATED APPLICATION AND PRIORITY CLAIM

This application claims priority under 35 U.S.C. § 119(e) to U.S. Provisional Patent Application No. 62/395,950 filed on Sep. 16, 2016, which is hereby incorporated by reference in its entirety.

TECHNICAL FIELD

This disclosure relates generally to measurement and control systems. More specifically, this disclosure relates to model-plant mismatch detection with a support vector machine for cross-directional process behavior monitoring.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators. Model-based industrial process controllers are one type of process controller routinely used to control the operations of industrial processes. Model-based process controllers typically use one or more models to mathematically represent how one or more properties within an industrial process respond to changes made to the industrial process.

Model-based controllers typically depend on having accurate models of a process' behavior in order to perform well and effectively control the process. As conditions change in the process, its models typically need to be updated. However, it is often difficult to determine whether a model accurately describes true process behavior using routine operating data. Moreover, performing some sort of experiment to improve the quality of the data for this purpose is generally undesirable because this may disturb the quality of a product being produced by the process.

SUMMARY

This disclosure provides model-plant mismatch detection with a support vector machine for cross-directional process behavior monitoring.

In a first embodiment, an apparatus includes at least one memory configured to store operating data associated with operation of a cross-directional industrial process that is controlled by at least one model-based process controller. The apparatus also includes at least one processing device configured, during a training period, to perform closed-loop model identification with a first portion of the operating data to identify multiple sets of first spatial and temporal models. The at least one processing device is also configured to identify clusters associated with parameter values of the first spatial and temporal models. The at least one processing device is further configured, during a testing period, to perform closed-loop model identification with a second portion of the operating data to identify second spatial and temporal models. The at least one processing device is also configured to determine whether at least one parameter value of at least one of the second spatial and temporal models falls outside at least one of the clusters. In addition, the at least one processing device is configured, in response to a determination that the at least one parameter value of at least one of the second spatial and temporal models falls outside at least one of the clusters, to detect that a mismatch exists between actual and modeled behaviors of the industrial process.

In a second embodiment, a method includes obtaining operating data associated with operation of a cross-directional industrial process that is controlled by at least one model-based process controller. The method also includes, during a training period, performing closed-loop model identification with a first portion of the operating data to identify multiple sets of first spatial and temporal models. The method further includes identifying clusters associated with parameter values of the first spatial and temporal models. The method also includes, during a testing period, performing closed-loop model identification with a second portion of the operating data to identify second spatial and temporal models. The method further includes determining whether at least one parameter value of at least one of the second spatial and temporal models falls outside at least one of the clusters. In addition, the method includes, in response to a determination that the at least one parameter value of at least one of the second spatial and temporal models falls outside at least one of the clusters, detecting that a mismatch exists between actual and modeled behaviors of the industrial process.

In a third embodiment, a non-transitory computer readable medium contains instructions that, when executed by at least one processing device, cause the at least one processing device to obtain operating data associated with operation of a cross-directional industrial process that is controlled by at least one model-based process controller. The medium also contains instructions that, when executed by the at least one processing device, cause the at least one processing device, during a training period, to perform closed-loop model identification with a first portion of the operating data to identify multiple sets of first spatial and temporal models. The medium further contains instructions that, when executed by the at least one processing device, cause the at least one processing device to identify clusters associated with parameter values of the first spatial and temporal models. The medium also contains instructions that, when executed by the at least one processing device, cause the at least one processing device, during a testing period, to perform closed-loop model identification with a second portion of the operating data to identify second spatial and temporal models. The medium further contains instructions that, when executed by the at least one processing device, cause the at least one processing device to determine whether at least one parameter value of at least one of the second spatial and temporal models falls outside at least one of the clusters. In addition, the medium contains instructions that, when executed by the at least one processing device, cause the at least one processing device, in response to a determination that the at least one parameter value of at least one of the second spatial and temporal models falls outside at least one of the clusters, to detect that a mismatch exists between actual and modeled behaviors of the industrial process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
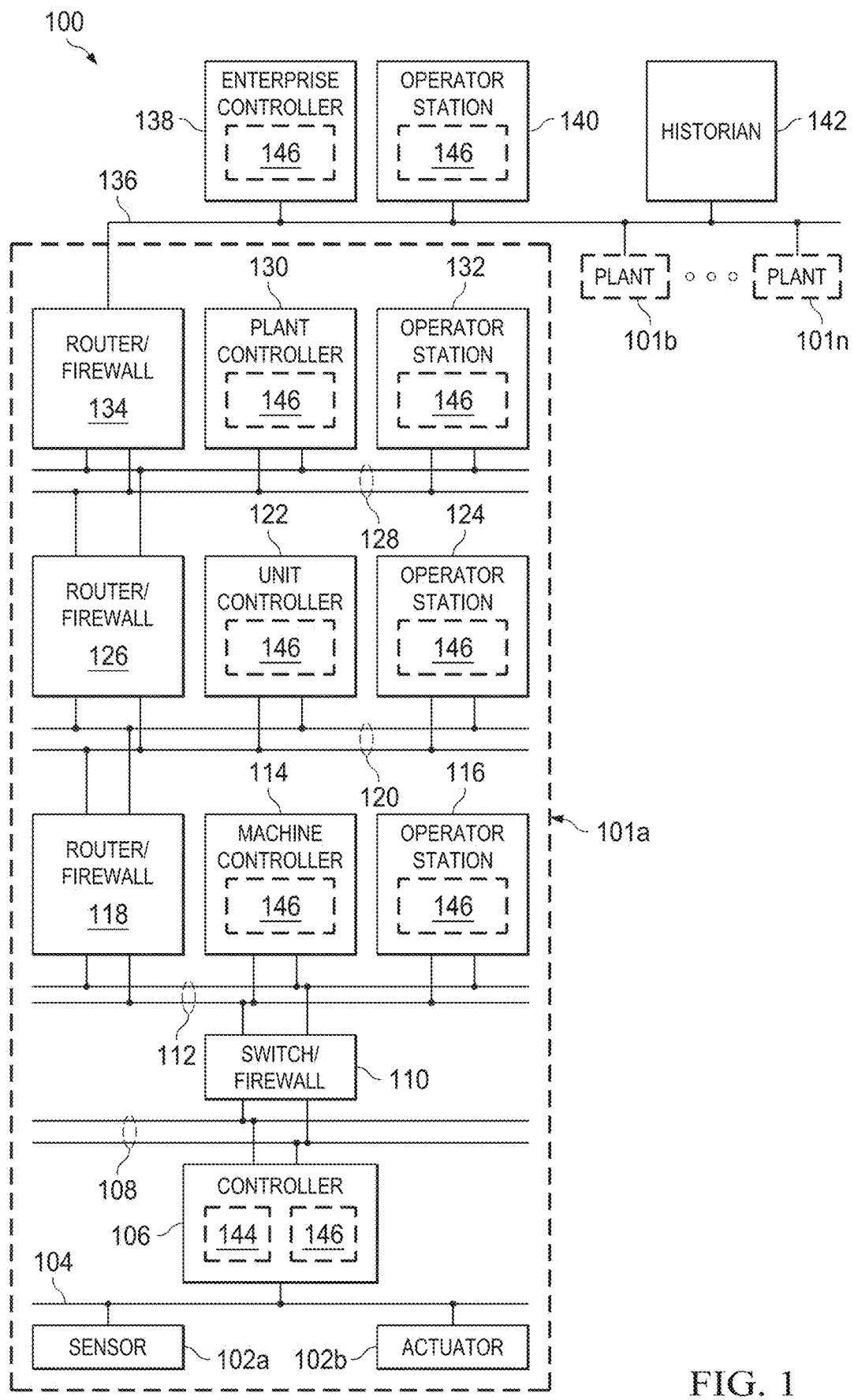
FIG. 1 illustrates a first example industrial process control and automation system according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers typically use one or more models to mathematically represent how one or more properties within an industrial process respond to changes made to the industrial process. Model-based controllers typically require accurate models of process behaviors in order to perform well. As conditions related to an industrial process change, the models for that process typically need to be updated. However, it is often difficult to determine from routine operating data whether a model accurately describes the true process behavior of an industrial process. Moreover, performing an experiment to improve the quality of the data for this purpose is often undesirable because the experiment may affect the quality of one or more products being manufactured or processed in the industrial process. This may be particularly true with cross-directional processes, such as paper-making processes, where the complexity of the problem and the problem size can heighten the need for automatically determining when conditions change and control may no longer be able to perform adequately.

As described in more detail below, this disclosure provides techniques for detecting significant model-plant mismatch for cross-directional processes using routine operating data. When mismatch is detected, existing models can be updated or new models can be created and used to control an industrial process, helping to maintain the quality of products being manufactured or processed in the industrial process. The techniques involve periodically identifying model parameters for different models based on routine operating data, and the model parameters are analyzed using a support vector machine to determine whether the models have deviated from an established cluster representing expected process behavior. To support this approach in cross-directional control (such as in a paper machine), a closed-loop identification approach is described for cross-directional processes. In this document, the phrase "cross-directional process" generally refers to an industrial process in which actuators operate across a product being manufactured or processed.

Among other things, these techniques allow cross-directional processes to be monitored without needing to add any perturbations to the process beyond what routinely occurs. Also, no knowledge of the actual control strategies used to control the cross-directional processes is needed. By monitoring for changes in process behaviors, process disturbances that a controller has responded to correctly are not identified as a control problem to be addressed. Thus, advanced controls can automatically detect changes in process behaviors and can initiate a designed experiment to re-identify accurate process models to keep the controller performing optimally.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

At least one of the controllers shown in FIG. 1 could denote a model-based controller that operates using one or more process models 144. For example, each of the controllers 106 could operate using one or more process models 144 to determine, based on measurements from one or more sensors 102a, how to adjust one or more actuators 102b. In some embodiments, each model 144 associates one or more manipulated or disturbance variables with one or more controlled variables. A controlled variable (CV) generally represents a variable that can be measured or inferred and that is ideally controlled to be at or near a desired setpoint or within a desired range of values. A manipulated variable (MV) generally represents a variable that can be adjusted in order to alter one or more controlled variables. A disturbance variable (DV) generally denotes a variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

As noted above, the process models 144 need to be reasonably accurate for model-based controllers to operate effectively, and the process models 144 typically need to be updated as conditions related to an industrial process change. However, it is often difficult to determine from routine operating data whether a model accurately describes the true process behavior of an industrial process, and performing experiments to gather data in order to determine whether a model accurately describes the true process behavior of an industrial process is often undesirable. Routine operating data generally includes data collected from one or more sensors or generated by one or more controllers (such as control signals for one or more actuators) during normal (non-testing) operation of a process.

In accordance with this disclosure, at least one component of the system 100 includes a tool 146 that analyzes routine operating data for a model-based controller in order to detect significant model-plant mismatch. Example techniques for detecting significant model-plant mismatch are described below. Also, as described in more detail below, the tool 146 can use a support vector machine as part of the analysis of the routine operating data. One example benefit of using these techniques is that significant model-plant mismatch can be automatically determined so that a model-based controller can have its model(s) 144 updated or replaced before the model-plant mismatch causes losses due to poor process control.

The tool 146 could be implemented in any suitable manner and using any suitable device. For example, the tool 146 could reside on any of the controllers or operator stations shown in FIG. 1. The tool 146 could also reside on any other suitable device(s) in FIG. 1, such as on a dedicated computing device. The tool 146 could be implemented using any suitable hardware or any suitable combination of hardware and software/firmware instructions. In particular embodiments, the tool 146 is implemented using software/firmware instructions that are executed by at least one processor of a computing device.

Although FIG. 1 illustrates one example of an industrial process control and automation system 100, various changes may be made to FIG. 1. For example, a control and automation system could include any number of sensors, actuators, controllers, servers, operator stations, networks, models, tools, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control and automation systems are highly configurable and can be configured in any suitable manner according to particular needs. In addition, while FIG. 1 illustrates one example environment in which model-plant mismatch detection can be used, this functionality can be used in any other suitable device or system.

Figure 2:
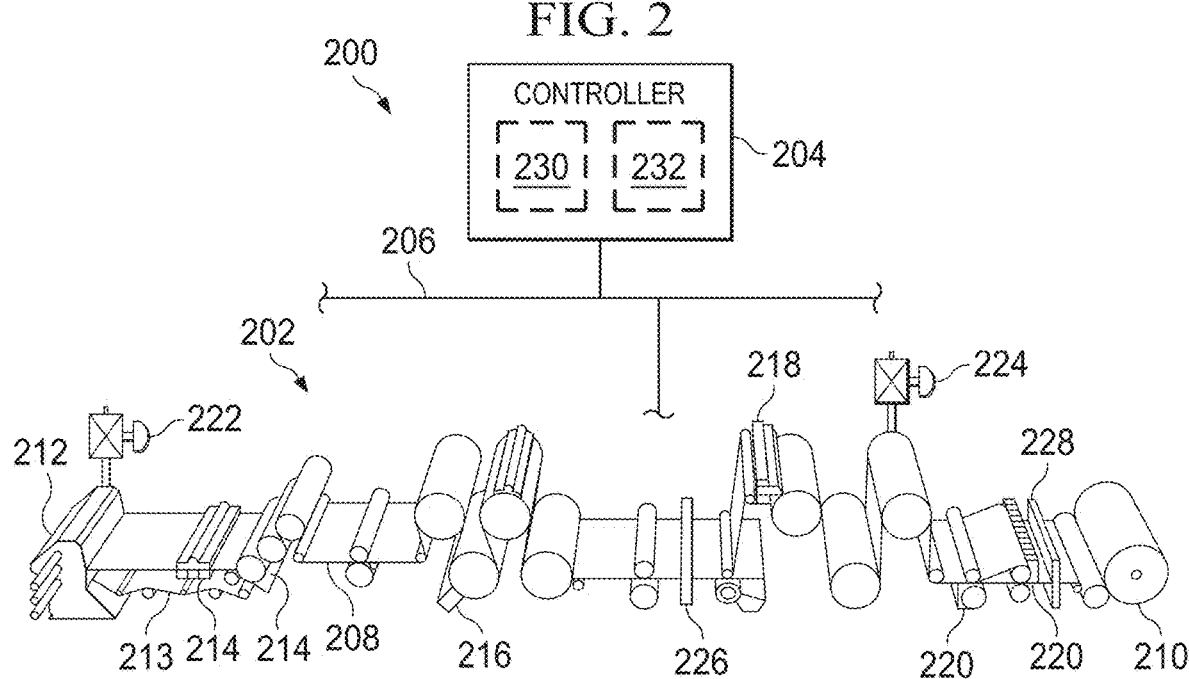
FIG. 2 illustrates a second example industrial process control and automation system according to this disclosure.

FIG. 2 illustrates a second example industrial process control and automation system 200 according to this disclosure. In particular, the system 200 of FIG. 2 denotes an example web manufacturing or processing system. As shown in FIG. 2, the system 200 includes a paper machine 202, a controller 204, and a network 206. The paper machine 202 includes various components used to produce a paper product, namely a paper web 208 that is collected at a reel 210. The controller 204 monitors and controls the operation of the paper machine 202, which may help to maintain or increase the quality of the paper web 208 produced by the paper machine 202.

In this example, the paper machine 202 includes at least one headbox 212, which distributes a pulp suspension uniformly across the machine onto a continuous moving wire screen or mesh 213. The pulp suspension entering the headbox 212 may contain, for example, 0.2-3% wood fibers, fillers, and/or other materials, with the remainder of the suspension being water. Arrays of drainage elements 214, such as vacuum boxes, remove as much water as possible to initiate the formation of the web 208. An array of steam actuators 216 produces hot steam that penetrates the paper web 208 and releases the latent heat of the steam into the paper web 208. An array of rewet shower actuators 218 adds small droplets of water (which may be air atomized) onto the surface of the paper web 208. The paper web 208 is then often passed through a calender having several nips of counter-rotating rolls. Arrays of induction heating actuators 220 heat the shell surfaces of various ones of these rolls.

Two additional actuators 222-224 are shown in FIG. 2. A thick stock flow actuator 222 controls the consistency of incoming stock received at the headbox 212. A steam flow actuator 224 controls the amount of heat transferred to the paper web 208 from drying cylinders. The actuators 222-224 could, for example, represent valves controlling the flow of stock and steam, respectively. These actuators may be used for controlling the dry weight and moisture of the paper web 208. Additional flow actuators may be used to control the proportions of different types of pulp and filler material in the thick stock and to control the amounts of various additives (such as retention aid or dyes) that are mixed into the stock.

In FIG. 2, the machine direction (MD) denotes the direction along the longer length of the web 208, and the cross direction (CD) denotes the direction across the shorter width of the web 208 (perpendicular to the machine direction). Various actuators in FIG. 2 (including actuators in the headbox 212, the drainage elements 214, the steam actuators 216, the rewet shower actuators 218, and the induction heating actuators 220) generally operate to alter characteristics of the web 208 across the width of the web 208. One or more of these sets of actuators therefore implements at least one cross-directional process in the paper machine 202.

This represents a brief description of one type of paper machine 202 that may be used to produce a paper product. Additional details regarding this type of paper machine 202 are well-known in the art and are not needed for an understanding of this disclosure. Also, while described as being used to manufacture a paper web, other types of machines for manufacturing or processing any suitable webs could be used.

In order to control the paper-making process, one or more properties of the paper web 208 may be continuously or repeatedly measured. The web properties can be measured at one or various stages in the manufacturing process. This information may then be used to adjust the paper machine 202, such as by adjusting various actuators within the paper machine 202. This may help to compensate for any variations of the web properties from desired targets, which may help to ensure the quality of the web 208. As shown in FIG. 2, the paper machine 202 includes one or more scanners 226-228, each of which may include one or more sensors. Each scanner 226-228 is capable of measuring one or more characteristics of the paper web 208. For example, each scanner 226-228 could include sensors for measuring the tension, caliper, moisture, anisotropy, basis weight, color, gloss, sheen, haze, surface features (such as roughness, topography, or orientation distributions of surface features), or any other or additional characteristics of the paper web 208.

Each scanner 226-228 includes any suitable structure or structures for measuring or detecting one or more characteristics of the paper web 208, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 204 receives measurement data from the scanners 226-228 and uses the data to control the paper machine 202. For example, the controller 204 may use the measurement data to adjust any of the actuators or other components of the paper machine 202. The controller 204 includes any suitable structure for controlling the operation of at least part of the paper machine 202, such as a computing device. Note that while a single controller 204 is shown here, multiple controllers 204 could be used, such as different controllers that control different variables of the web.

The network 206 is coupled to the controller 204 and various components of the paper machine 202 (such as the actuators and scanners). The network 206 facilitates communication between components of the system 200. The network 206 represents any suitable network or combination of networks facilitating communication between components in the system 200. The network 206 could, for example, represent a wired or wireless Ethernet network, an electrical signal network (such as a HART network), a pneumatic control signal network, or any other or additional network(s).

The controller(s) 204 can operate to control one or more aspects of the paper machine 202 using one or more models 230. For example, each model 230 could associate one or more manipulated or disturbance variables with one or more controlled variables. The controlled variables typically include one or more properties of the web 208. The manipulated variables typically include setpoints, settings, or other values used by various actuators in the system 200.

In accordance with this disclosure, at least one component of the system 200 includes a tool 232 that analyzes routine operating data for a model-based controller in order to detect significant model-plant mismatch. Example techniques for detecting significant model-plant mismatch are described below. Also, as described in more detail below, the tool 232 can use a support vector machine as part of the analysis of the routine operating data.

The tool 232 could be implemented in any suitable manner and using any suitable device, such as when the tool 232 resides on the controller 204 or a dedicated computing device (such as an operator station or other device). The tool 232 could be implemented using any suitable hardware or any suitable combination of hardware and software/firmware instructions, such as when the tool 232 is implemented using software/firmware instructions that are executed by at least one processor of a computing device.

Although FIG. 2 illustrates another example of an industrial process control and automation system 200, various changes may be made to FIG. 2. For example, other systems could be used to produce other paper or non-paper products. Also, while shown as including a single paper machine 202 with various components and a single controller 204, the system 200 could include any number of paper machines or other machinery having any suitable structure, and the system 200 could include any number of controllers. In addition, while FIG. 2 illustrates another example environment in which model-plant mismatch detection can be used, this functionality can be used in any other suitable device or system.

Figure 3:
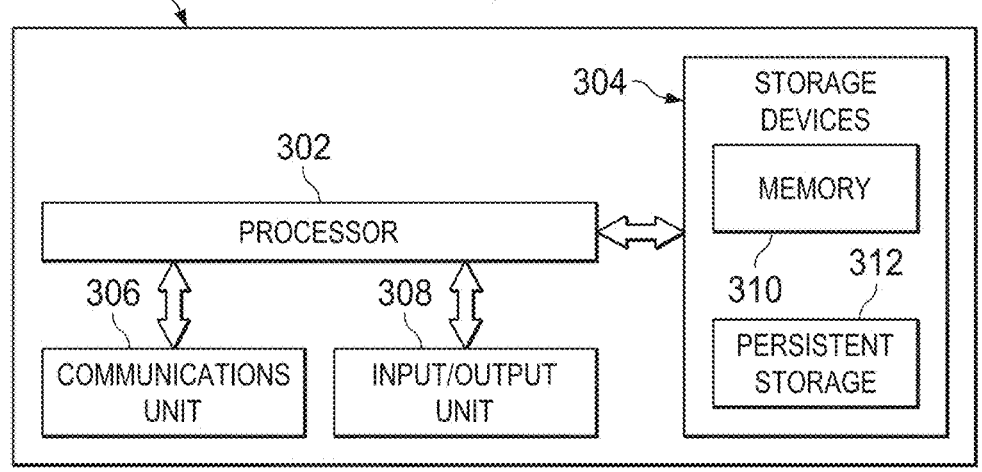
FIG. 3 illustrates an example device supporting model-plant mismatch detection for cross-directional process behavior monitoring according to this disclosure.

FIG. 3 illustrates an example device 300 supporting model-plant mismatch detection for cross-directional process behavior monitoring according to this disclosure. The device 300 could, for example, represent any of the devices in FIGS. 1 and 2 that can execute the tool 146, 232. However, the device 300 could be used in any other suitable system, and the tool 146, 232 could be implemented using any other suitable device.

As shown in FIG. 3, the device 300 includes at least one processing device 302, at least one storage device 304, at least one communications unit 306, and at least one input/output (I/O) unit 308. The processing device 302 executes instructions that may be loaded into a memory 310. The processing device 302 may include any suitable number(s) and type(s) of processors or other devices in any suitable arrangement. Example types of processing devices 302 include microprocessors, microcontrollers, digital signal processors, field programmable gate arrays, application specific integrated circuits, and discrete logic devices.

The memory device 310 and a persistent storage 312 are examples of storage devices 304, which represent any structure(s) capable of storing and facilitating retrieval of information (such as data, program code, and/or other suitable information on a temporary or permanent basis). The memory device 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 supporting model-plant mismatch detection for cross-directional process behavior monitoring, various changes may be made to FIG. 3. For example, various components in FIG. 3 could be combined, further subdivided, rearranged, or omitted and additional components could be added according to particular needs. Also, computing devices can come in a wide variety of configurations, and FIG. 3 does not limit this disclosure to any particular configuration of computing device.

Figure 4:
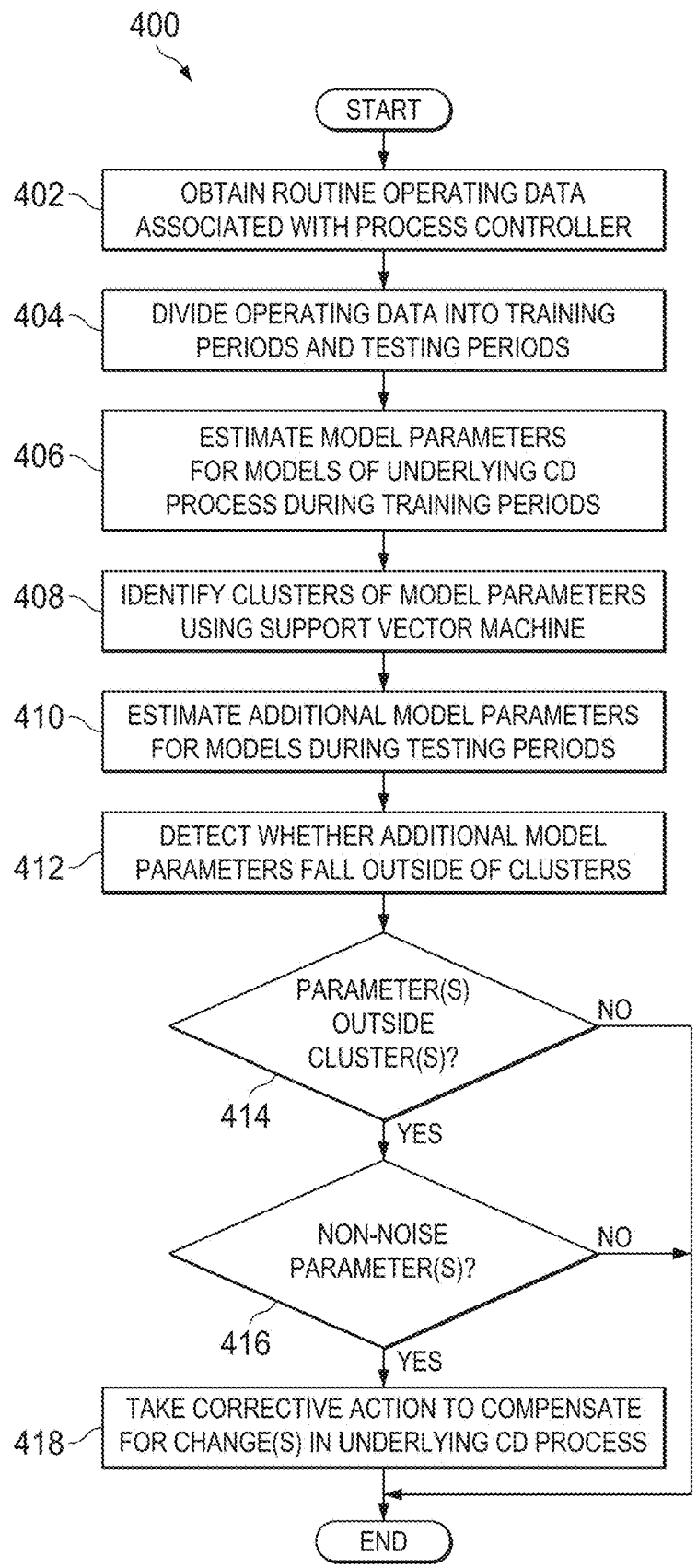
FIG. 4 illustrates an example method for model-plant mismatch detection for cross-directional process behavior monitoring according to this disclosure.

FIG. 4 illustrates an example method 400 for model-plant mismatch detection for cross-directional process behavior monitoring according to this disclosure. For ease of explanation, the method 400 is described below as being implemented using the device 300 of FIG. 3 in the systems 100, 200 of FIGS. 1 and 2. However, the method 400 could be performed using any suitable device and in any suitable system.

As shown in FIG. 4, routine operating data associated with a model-based industrial process controller is obtained at step 402. This could include, for example, the processing device 302 that executes the tool 146, 232 obtaining data associated with operation of a model-based controller (such as a controller 106 or 204) from that controller or from another device. If the tool 146, 232 is executed within the controller 106 or 204, this could include the processing device 302 collecting the routine operating data during execution of control logic by the controller.

The operating data is divided into multiple periods, including training periods and testing periods, at step 404. This could include, for example, the processing device 302 that executes the tool 146, 232 splitting the routine operating data into the training and testing periods. Any suitable mechanism can be used to divide the data into the different periods.

Model parameters for multiple models representing an underlying cross-directional process are estimated during the training periods at step 406. This could include, for example, the processing device 302 that executes the tool 146, 232 performing a model identification algorithm using the routine operating data in the training periods to identify parameters for a spatial model, a temporal model, and a noise model. In particular embodiments, the closed-loop model identification technique described below could be used. This technique uses a sliding window to repeatedly identify spatial, temporal, and noise model parameters using different parts of data in the training periods.

Clusters of model parameters are identified at step 408. This could include, for example, the processing device 302 that executes the tool 146, 232 using a support vector machine to determine the clustering of the model parameters. The support vector machine could implement a kernel function that generates linear or nonlinear clustering of data by mapping original data into a space where a cluster boundary can be identified. Using the support vector machine, clusters of "normal" model parameters can be identified for the spatial, temporal, and noise model parameters identified from the training data.

Additional model parameters for multiple models representing the underlying cross-directional process are estimated during the testing periods at step 410. This could include, for example, the processing device 302 that executes the tool 146, 232 performing the same operations as in step 406 with the routine operating data in the testing periods to identify additional spatial, temporal, and noise model parameters.

Any of the additional model parameters generated during the testing periods that fall outside of their respective clusters are detected at step 412. This could include, for example, the processing device 302 that executes the tool 146, 232 using the support vector machine to determine whether any new spatial, temporal, and noise model parameters fall outside of the clusters that were identified using the spatial, temporal, and noise model parameters from the prior training period(s). As described in more detail below, this could include the processing device 302 computing the functional distance of a point representing a new model parameter to a cluster associated with that model parameter. The distance can be used to classify whether the new model parameter is inside or outside of the associated cluster.

If it is determined that at least one of the additional model parameters falls outside of its respective cluster at step 414, a determination is made whether any of these additional model parameters is not a noise parameter at step 416. This could include, for example, the processing device 302 that executes the tool 146, 232 determining whether an identified model parameter relates to a spatial model or a temporal model, which may be indicative of model-plant mismatch. This could also include the processing device 302 determining whether an identified model parameter relates to a noise model, which may not be indicative of model-plant mismatch. As described below, this allows the mismatch detection algorithm to monitor for mismatches in process models while discriminating against changes in noise models.

When at least one model parameter identified during a testing period falls outside of its associated cluster (and is not a noise model parameter), this may be indicative of a significant change to the underlying CD process, meaning there may be model-plant mismatch. If that is detected, some type of corrective action can be taken at step 418. This could include, for example, the processing device 302 that executes the tool 146, 232 generating an alarm indicating that a model-plant mismatch has been detected. Operators may then perform or initiate a model identification process to collect data in order to generate a new process model or to update an existing process model. This may also include the processing device 302 initiating a model identification process to collect data and generate a new or updated process model. The model identification process could be performed by the processing device 302 or by another device. Any other or additional actions could also occur in response to an identified model-plant mismatch.

Although FIG. 4 illustrates one example of a method 400 for model-plant mismatch detection for cross-directional process behavior monitoring, various changes may be made to FIG. 4. For example, while shown as a series of steps, various steps in FIG. 4 could overlap, occur in parallel, occur in a different order, or occur any number of times.

Additional details regarding specific techniques for model-plant mismatch detection are provided below. Note that the details provided below are examples only and that other implementations of the techniques described in this patent document could be used. Also note that while specific details are provided below, other implementations of the techniques described below could be used.

The following describes a model-plant mismatch detection framework for CD processes related to paper machines. This framework includes (i) CD closed-loop identification with routine operating data and (ii) model-plant mismatch detection with one-class support vector machine (SVM) training and prediction. The proposed closed-loop identification algorithm is iterative, alternately identifying finite impulse response (FIR) coefficients of spatial and temporal models. This iterative identification algorithm is convergent and provides consistent estimates for those parameters asymptotically. A one-class SVM model is based on model estimates that are generated using training data, and the SVM model is used to predict the occurrence of mismatch using testing data. Among other things, this approach allows model-plant mismatch detection to occur using routine operating data that is free of any external excitations. Moreover, this approach allows monitoring for mismatches in process models while discriminating against changes in noise models used by controllers. Note, however, that the techniques described below are not limited to use with paper machines and could be extended to other cross-directional processes.

Figure 5:
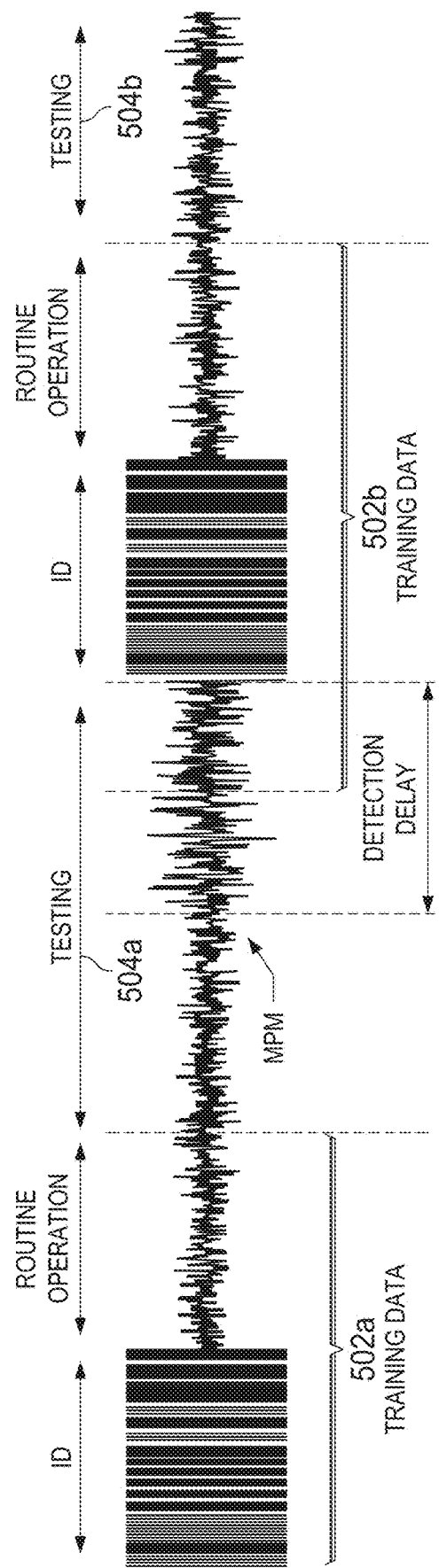
FIGS. 5 through 7 illustrate example uses of model-plant mismatch detection for cross-directional process behavior monitoring according to this disclosure.
Figure 6:
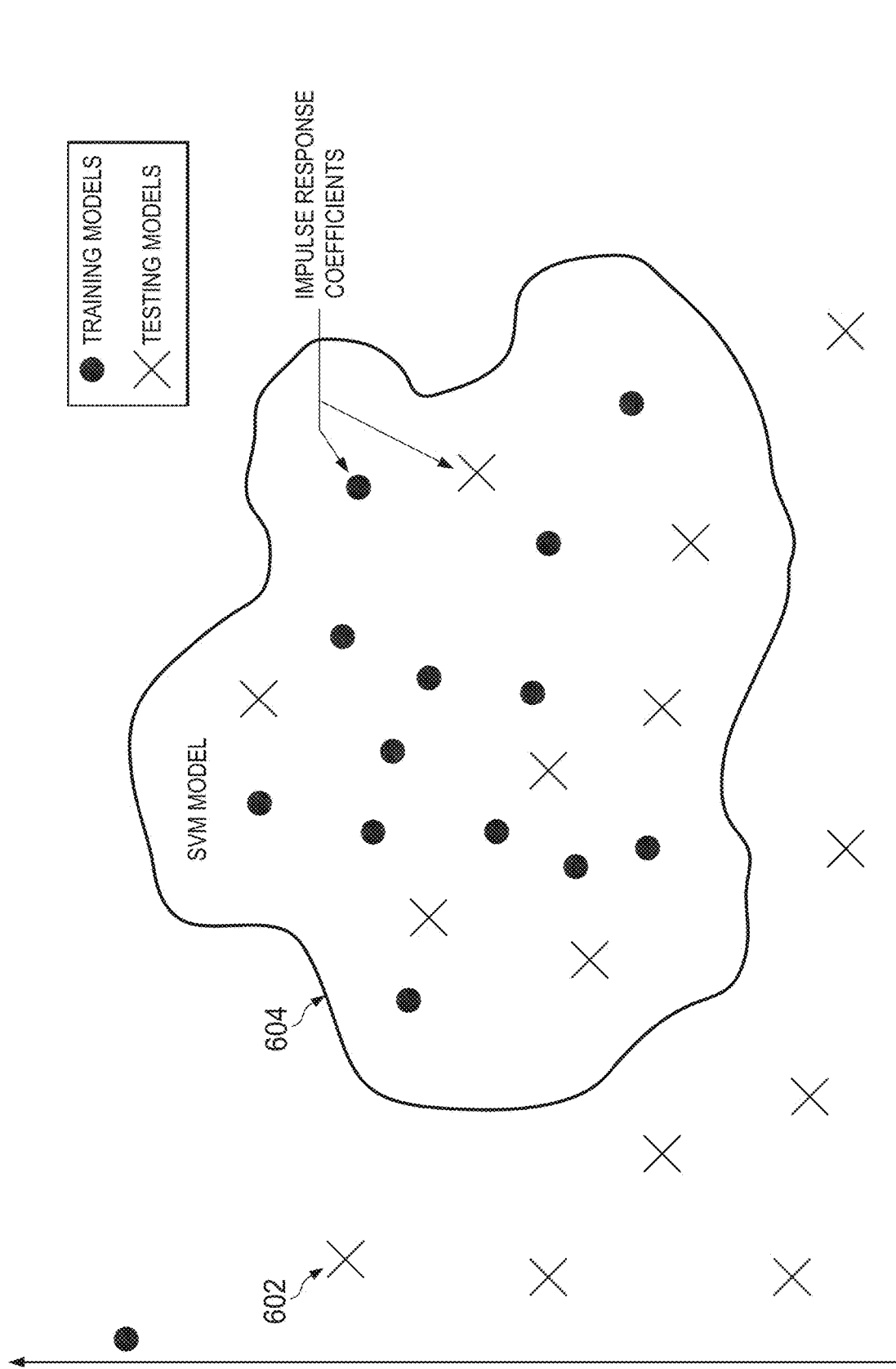
Figure 7:
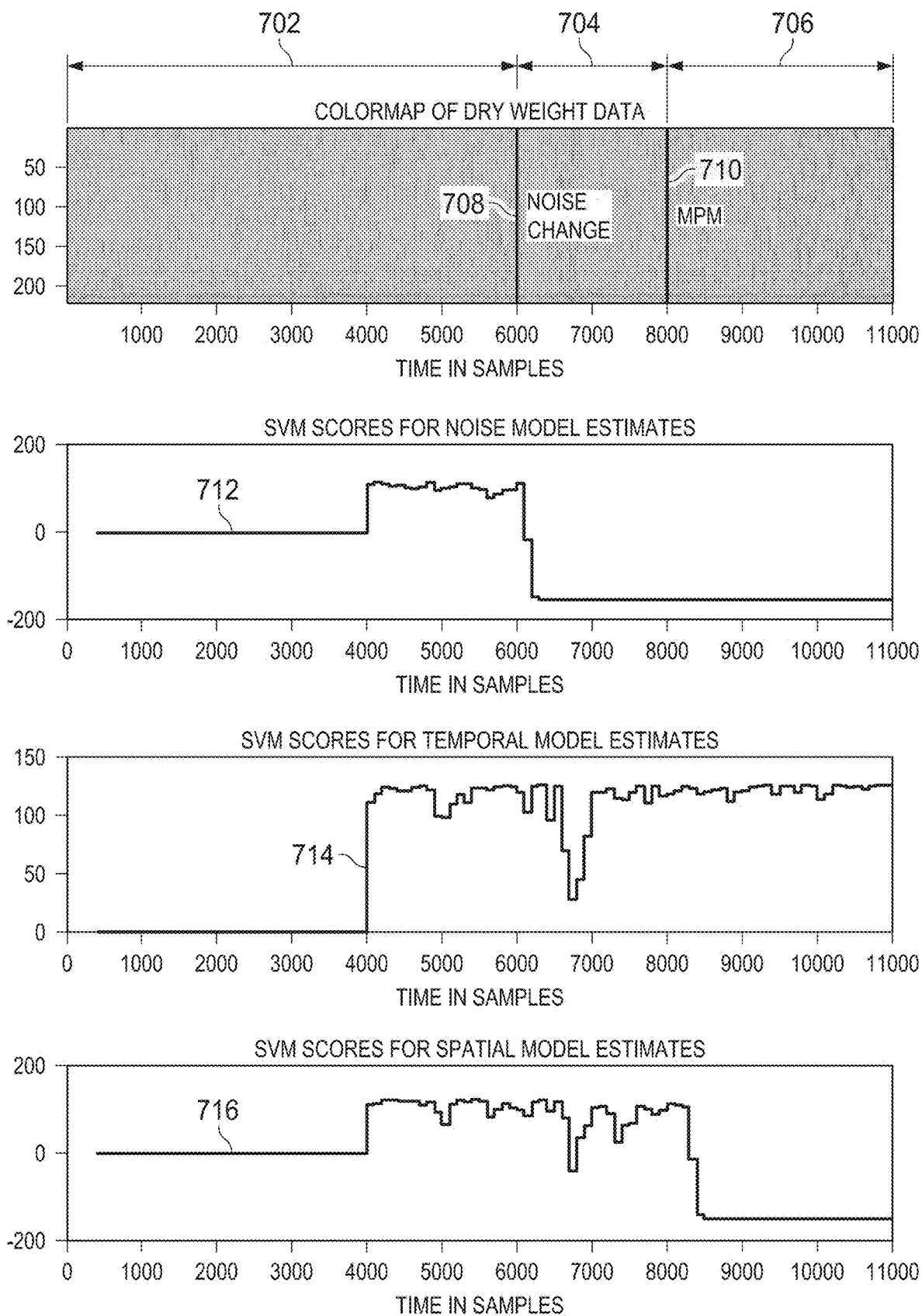

In general, the approach described below involves the following. Training data is used as a benchmark, and model-plant mismatch detection operates to detect changes incurred in testing data relative to the training data. Closed-loop identification is used with the training data, and an SVM model is generated based on the acquired process models. The SVM model is used to predict the presence of model-plant mismatch in the testing data. To avoid bias due to under-modeling, an FIR representation of the models could be used in the closed-loop identification. A support vector machine is used for binary classifications and provides both robustness in terms of reducing false classifications and easy generalization to incorporate kernel functions. The support vector machine can also perform better than other classification techniques when the dimension of data points is large. This feature fits here since the data points can include long FIR coefficients of CD process models. In particular embodiments, a one-class SVM can be used here, and mismatch monitoring can be treated as an anomaly detection problem. FIGS. 5 through 7 illustrate example uses of model-plant mismatch detection for cross-directional process behavior monitoring according to this disclosure.

CD Process Model

In the following discussion, assume that the following single-array CD process is employed in a paper machine.

$$S_1: y(t)=g^o(q^{-1})G^o u(t-d)+v(t) \quad (1)$$

where $y(t) \in \mathbb{R}^m$ and $u(t) \in \mathbb{R}^n$ represent a measured output signal (a CV) and a measured input signal (an MV), respectively. Note that m and n are the dimensions of the CV and MV profiles, respectively. Without a loss of generality, assume that m>>n and that m is an integer multiple of n, meaning m=kn, where $k \in \mathbb{Z}$. Here, $v(t) \in \mathbb{R}^m$ is a colored measurement noise vector, and $g^o(q^{-1})$ is a univariate transfer function modeling the dynamics of the process in a temporal direction. Assume that $g^o(q^{-1})$ is a scalar model, which is common in practice since most actuators along the cross direction demonstrate similar dynamics and which can greatly simplify the analysis of underlying processes. In fact, numerous industrial examples have revealed that a first-order-plus-time-delay model is sufficient to represent temporal dynamics. Thus, it may be assumed that $g^o(q^{-1})$ can be obtained by a first-order model with unit gain, such as:

$$g^o(q^{-1}) = \frac{1-f^o}{1-f^o q^{-1}} \quad (2)$$

where $f^o=\exp(-T_s/T_p)$ with $T_p$ and $T_s$ representing the time constant and sampling interval, respectively. $G^o \in \mathbb{R}^m$ is a steady-state gain matrix that represents the spatial responses of the actuator array at steady-state, and d represents the discrete time delay. The superscript "o" is used to denote the true process.

The spatial static model $G^o$ may generally be assumed to be Toeplitz-structured, meaning that each column is a shifted version of the cross-directional discretization of the so-called spatial impulse response curve b(x), where x is the spatial coordinate. The spatial impulse response curve could be expressed as:

$$b(x) = \frac{\gamma}{2} \left\{ e^{-\frac{\alpha(x+\beta\xi)^2}{\xi^2}} \cos\left[\frac{\pi(x+\beta\xi)}{\xi}\right] + e^{-\frac{\alpha(x+\beta\xi)^2}{\xi^2}} \cos\left[\frac{\pi(x+\beta\xi)}{\xi}\right] \right\} \quad (3)$$

where the gain $\gamma$, the width $\xi$, the divergence $\beta$, and the attenuation $\alpha$ are four parameters determining the shape of b(x). For convenience, define $\theta_s=[\gamma \ \xi \ \beta \ \alpha]^T$ and use $\theta_s^o$, to denote the true values of the spatial parameters in Equation (1). The $(i,j)^{th}$ entry of $G^o$ can be determined by the value $b(d_s i-c_j; \theta_s^o)$, where $d_s$ is the spatial distance between neighboring measurement bins and $c_j$ is the spatial response center of the $j^{th}$ actuator. Equation (3) is highly nonlinear in its parameters. However, if the entries of $G^o$ are treated directly as the spatial parameters that are to be estimated, Equation (1) is linear individually in spatial and temporal parameters. According to the Toeplitz structure, $G^o$ could be decomposed as follows.

$$G^o = \sum_{k=1}^{q^o} c_k^o E_k \qquad (4)$$

where $c_k^o$ represents a scalar standing for the $k^{th}$ elements in $G^o$ and $E_k$ represents the corresponding $k^{th}$ basis matrix. Taking m=6, n=3, and $q^o=2$ as an example, the following could be obtained.

$$G^o = \begin{bmatrix} c_1^o & c_3^o & 0 \\ c_2^o & c_2^o & 0 \\ c_3^o & c_1^o & c_3^o \\ 0 & c_2^o & c_2^o \\ 0 & c_3^o & c_1^o \\ 0 & 0 & c_2^o \end{bmatrix}, E_1 = \begin{bmatrix} 1 & 0 & 0 \\ 0 & 0 & 0 \\ 0 & 1 & 0 \\ 0 & 0 & 0 \\ 0 & 0 & 1 \\ 0 & 0 & 0 \end{bmatrix}, E_3 = \begin{bmatrix} 0 & 1 & 0 \\ 0 & 0 & 0 \\ 1 & 0 & 1 \\ 0 & 0 & 0 \\ 0 & 1 & 0 \\ 0 & 0 & 0 \end{bmatrix} \qquad (5)$$

With the above decomposition, the spatial model $G^o$ can be identified by estimating the parameters $c^o=[c_1^o, \ldots c_{q^o}^o]^T$ instead of those in Equation (3). Note that an implicit yet standard assumption in the above CD process model is the separability between the temporal dynamic model $g^o(q^{-1})$ and spatial static model $G^o$. Such a feature connects the typical CD process with Hammerstein models.

CD Noise Model

Many CD system identification approaches only consider situations with v(t) being Gaussian white noise. In practice, the physical nature of measurement devices traveling back and forth in the cross direction (such as in the paper machine 202) makes v(t) colored noise in both spatial and temporal directions. Several noise models, varying from simple to complex, have been available to precisely represent the realistic noise encountered. Common practice is to use a multivariate band-diagonal autoregressive (AR) or autoregressive moving-average (ARMA) structure so that the temporal correlation is modeled through each filter on the diagonal and the spatial correlation is represented by interactions among off-diagonal entries. An alternative is choosing the noise model as diagonal while enforcing an innovation sequence to have a non-diagonal covariance matrix.

For the latter method, the spatial correlation of the colored noise v(t) is reflected by the covariance matrix. From a system identification point of view, the latter method admits inversing the noise model matrix without concerning the issue of invertability of the noise matrix, which often arises in the former method. Moreover, analogous to the temporal dynamic model, assume that all output channels possess the same noise model in the temporal direction. Based on this, the following could be obtained.

$$v(t)=H^o(q^{-1})Ie^o(t) \qquad (6)$$

where $H^o(q^{-1})$ represents a scalar monic transfer function that is stable and inversely stable, $I \in \mathbb{R}^{m \times m}$ represents an identity matrix, and $e^o(t) \in \mathbb{R}^m$ represents a zero-mean Gaussian white noise vector with covariance:

$$E[e^o(t)e^o(t-s)^T]=\delta_{s,t}\Sigma \in \mathbb{R}^{m \times m} \qquad (7)$$

Note that $\Sigma$ can be non-diagonal and structured to represent the spatial correlations of CD measurement noise. In general, it may be difficult to acquire prior information about the true noise model structure $H^o(q^{-1})$ in Equation (6). For closed-loop identification (especially the direct identification approach), an incorrect specification of the noise model often leads to bias in the process model estimate. A novel closed-loop identification technique for a CD process model is described below and addresses this issue.

High-Order ARX Approximation of CD Process Model

Any stable linear transfer function can be approximated arbitrarily well by a high-order FIR model. Thus, the CD process model in Equations (1)-(7) can be represented using a sufficiently high-order autoregressive exogenous (ARX) structure in order to avoid the bias issue in direct closed-loop identification stemming from misspecification of the noise model structure. For example, the CD model can be rewritten as follows, given the particular diagonal noise model in Equation (6) and the decomposition of $G^o$ in Equation (4).

$$S_2: A^o(q^{-1}, a^o)y(t) = B^o(q^{-1}, b^o)\sum_{k=1}^{q^o} c_k^o E_k u(t-d) + e^o(t) \qquad (8)$$

Here, $A^o(q^{-1},a^o)=1/H^o(q^{-1})$ is a scalar polynomial showing the FIR representation of the inverse of the noise model, which can be expressed as:

$$A^o(q^{-1}, a^o) = 1 + \sum_{k=1}^{n_a^o} a_k^o q^{-k}, a^o = [a_1^0 \ldots a_{n_a^o}^0]^T \qquad (9)$$

The polynomial $B^o(q^{-1}, b^o)=A^o(q^{-1},a^o)g^o(q^{-1})$ is the FIR form of the scalar transfer function with the following expression.

$$B^o(q^{-1}, b^o) = \sum_{k=0}^{n_b^o} b_k^o q^{-k}, b^o = [b_1^0 \ldots b_{n_a^o}^0]^T \qquad (10)$$

Define the parameter vector $\theta^{oT}=[a^{oT} \ b^{oT} \ c^{oT}] \in \mathbb{R}^{n_a^0+n_b^0+1+q^0}$. Strictly speaking, $A^o(q^{-1},a^o)$ and $B^o(q^{-1}, b^o)$ are of infinite orders since they are the infinite series expansions of rational functions. However, under the stability assumption of $A^O(q^{-1},a^o)$ and $B^O(q^{-1},b^o)$, their coefficients decay to be negligible after sufficient lags. Therefore, in practice, it makes sense to use a finitely-truncated form to perform the corresponding identifications. With the above manipulations, the CD process model can be transformed into an ARX-Hammerstein structure, which can be much simpler to handle than the original Box-Jenkins-Hammerstein structure. Note, however, that this does increase the number of parameters to estimate in the high-order representation, which places more stringent requirements on the informativeness of closed-loop data.

Presence of Feedback

Typical constraints in an MPC algorithm include actuator limits, maximum change between successive control actions, constraints on an averaged actuator profile in an array, and bounds for bending limits. When some of these constraints are active, the MPC controller can display a piecewise linear behavior or a nonlinear behavior, depending on the formulation of the controller's objective functions. Hence, the feedback can be denoted as:

$$u(t)=k(u^{t-1},y^t,t) \qquad (11)$$

where $u^{t-1}=\{u(t-1), \ldots, u(t-1)\}$ and $y^t$ is defined in an analogous way. Note that for closed-loop identification with routine operating data where external excitations and setpoint changes are absent, nonparametric identification methods often yield the controller inverse as the process model estimate, which is incorrect. One way to prevent this is by imposing the true time delay to Equation (8) when performing high-order ARX identification. Assume that the true time delay is available throughout the derivations below. However, in practice, this stringent assumption can be relaxed, and the proposed mismatch scheme works even when the true time delay is not available. In that case, a priori knowledge of the true time delay can be incorporated into the identification algorithm.

Another concern in closed-loop identification is the identifiability of the process model. It has been discovered that, for linear feedback control, higher orders in the regulator and larger time delays in the process generally increase the informativeness of closed-loop data. The specific relationships among these factors have been investigated elsewhere. However, time-varying or nonlinear regulators in Equation (11) are enough to guarantee an informative experiment. It can be shown that, for the CD process model in Equations (1)-(7), closed-loop identifiability exists without external excitations or setpoint changes even under fairly weak conditions.

Model-Plant Mismatch Detection Algorithm

This section explains the overall concept of detecting the presence of model-plant mismatch with routine operating data. As introduced above, closed-loop identification of a process model faces a number of challenging issues, such as identifiability and bias due to noise model misspecification. Although these issues can be resolved or diminished with proper techniques, poor quality of routine operating data can render model parameter estimates subject to large variance. This variance impedes the ability to distinguish whether offsets of process model estimates from the true model are attributable to model-plant mismatch or the variance. In other words, it is likely that false alarms or missed alarms occur if one does not carefully distinguish the effects caused by parameter variance from those caused by model-plant mismatch.

One solution to this problem is to put forward an appropriate boundary around the true model to describe the range of uncertainties associated with model estimates. Any model that falls inside this boundary is regarded as normal, and its discrepancy with the true model is considered to be caused by the variance of parameter estimates. In order to obtain a reasonable boundary that is representative of this variance, a portion of routine operating data with satisfactory control performance can be selected as training data. In general, routine data right after a previous closed-loop experiment can be chosen as the training data since it is likely that this data does not contain a mismatch. The rest of the routine data can be considered as testing data.

Consecutive closed-loop identifications are performed, such as in the form of moving windows in the training data. Model estimates from the training data form a benchmarking cluster depicting the effects of variance from model estimation. For the testing data, the same moving-window identification can be applied, and the model estimates are examined to determine whether they are located within the benchmarking cluster. If so, the algorithm can determine that there is no mismatch present in the underlying testing data set. FIG. 5 illustrates the concept of splitting routine operating data into training stages (including two training stages 502a-502b) and test stages (including two test stages 504a-504b). As noted above, the training stages can be selected to occur immediately after system identification since it is unlikely that mismatch exists immediately after the system identification.

A one-class SVM can be an effective choice to describe the benchmarking cluster. One advantage of a support vector machine is its ability to handle high-dimensional data compared to other clustering techniques. Moreover, the SVM classification problem can be easily formulated as a convex optimization, which admits efficient algorithms that guarantee convergence to a global optimum. In this approach, a one-class SVM can be trained based on the models identified using the training data, and the trained SVM can be used to predict the occurrence of model-plant mismatch for any given estimated model from the testing data.

Specific to the CD mismatch detection problem, the temporal model and the spatial model can be separately examined with the above techniques. In order to integrate all possible parametric mismatches (such as gain mismatch and time constant mismatch), models can be estimated in FIR forms. False alarms could be generated if reporting a mismatch solely based on estimated parameters, since it is possible that multiple parametric mismatches yield the same process models as a whole. Therefore, the FIR form of a model is useful in terms of examining the changes in this model. The high-dimensional nature of FIR forms is also easily handled via SVM training and prediction.

FIG. 6 illustrates the concept of detecting model-plant mismatch with SVM techniques. In FIG. 6, each point 602 stands for an FIR representation of a model. The models in circles are those obtained from training data, and they form a benchmarking cluster 604. The models in cross points are those obtained from testing data, and those models outside the benchmarking cluster 604 are viewed as mismatched models.

As can be seen here, closed-loop identification and SVM training constitute two building blocks for the mismatch detection scheme. In the following sections, a novel closed-loop CD identification is proposed, and the SVM training techniques are described in more detail. Note, however, that the mismatch detection scheme is not required to use the closed-loop CD identification and SVM training techniques described below and that other implementations are possible.

Closed-Loop CD Identification

This section presents a novel closed-loop CD identification approach that gives convergent and consistent estimates even under weak conditions based on closed-loop data. The high-order ARX representation in Equation (8) is used here. The technique alternately identifies the spatial model $G^o$ and the temporal model $\{A_o(z^{-1}), B_o(z^{-1})\}$ until the parameters converge. When identifying the spatial (or temporal) parameters, the temporal (or spatial) parameters can be fixed to the latest values.

Based on the previous analysis of $g^o(q^{-1})$, the temporal model could be parameterized with a first-order model structure in the following form.

$$g(q^{-1}, \theta_T) = \frac{h}{1 - fq^{-1}}, \theta_T \in \Omega_T \qquad (12)$$

where $\theta_T=[hf]^T$ represents the temporal parameter and $\Omega_T$ represents a compact set. The time delay d is absorbed into the input signal in Equation (1). The iterative identification algorithm deals primarily with the high-order ARX representation in Equation (8) of the original CD process. This model can be parameterized as follows.

$$M: A(q^{-1},a)y(t)=B(q^{-1},b)G(c)u(t-d)+e(t) \qquad (13)$$

with:

$$A(q^{-1}, a) = 1 + \sum_{k=1}^{n_a} a_k q^{-k}, \qquad (14)$$

$$B(q^{-1}, b) = 1 + \sum_{k=0}^{n_b} b_k q^{-k},$$

$$G(c) = \sum_{k=1}^{q} c_k E_k$$

Here, $a=[a_1 \ldots a_{n_a}]^T$, $b=[b_0 \ldots b_{n_b}]^T$, and $c=[c_1 \ldots c_q]^T$. Also, $n_a$ and $n_b$ represent the orders of the ARX model, and q represents the selected spatial order. The temporal model $\{A(q^{-1},a),B(q^{-1},b)\}$ is assumed to be scalar transfer functions.

To derive the predictor form of Equation (13), start with the $i^{th}$ output channel $y_i(t)$ and generalize the results to the overall output. Define $\bar{u}^k(t)=E_k u(t) \in \mathbb{R}^m$, where $k=1, \ldots, q$. With the high-order ARX parameterization in Equation (13), the one-step-ahead prediction for the $i^{th}$ output can be expressed as:

$$\hat{y}_i(t|t-1) = -[A(q^{-1}, a) - 1]y_i(t) + B(q^{-1}, b) \sum_{k=1}^{q} c_k \bar{u}_i^k(t-d), \qquad (15)$$

$$i=1, \ldots, m$$

Straightforward calculations yield:

$$\hat{y}_i(t|t-1)=\psi_{y_i}(t)a+\psi_{\bar{u}_i}(t-d)Cb, i=1, \ldots, m \qquad (16)$$

where:

$$C=\text{diag}\{c,c, \ldots c\} \qquad (17)$$

$$\psi_{y_i}(t)=[-y_i(t-1) \ldots -y_i(t-n_a)] \qquad (18)$$

$$\psi_{\bar{u}_i}(t)=[\bar{u}_i^1(t) \ldots \bar{u}_i^q(t)| \ldots |\bar{u}_i^1(t-n_b) \ldots \bar{u}_i^q(t-n_b)] \qquad (19)$$

It follows that the predictor form of the overall output is:

$$\hat{y}_i(t|t-1) = [\psi_y(t)\psi_{\bar{u}}(t-d)]\begin{bmatrix} a \\ Cb \end{bmatrix} \qquad (20)$$

where:

$$\psi_y(t) = \begin{bmatrix} \psi_{y_1}(t) \\ \vdots \\ \psi_{y_m}(t) \end{bmatrix}, \psi_{\bar{u}}(t) = \begin{bmatrix} \psi_{\bar{u}_1}(t) \\ \vdots \\ \psi_{\bar{u}_m}(t) \end{bmatrix} \qquad (21)$$

For parameter estimation, consider the following set of input-output data $Z^N$ generated according to $S_2$ under the controller defined in Equation (8).

$$Z^N=\{y(1),u(1), \ldots, y(N),u(N)\} \qquad (22)$$

Denote $\theta^T=[a^T b^T c^T] \in \mathbb{R}^{n_a+n_b+1+q}$ stacking all temporal and spatial parameters. The loss function of the parameter estimation can be formulated as:

$$V_N(\theta) = \frac{1}{N} \sum_{t=1}^{N} \varepsilon^T(t, \theta)\varepsilon(t, \theta) \qquad (23)$$

where $\varepsilon(t,\theta) \in \mathbb{R}^m$ represents the prediction error and can be expressed as:

$$\varepsilon(t,\theta)=y(t)-\hat{y}(t|t-1) \qquad (24)$$

Optimal parameter estimates $\hat{\theta}_N$ can be obtained by:

$$\hat{\theta}_N = \arg\min_{\theta \in \Omega} V_N(\theta) \qquad (25)$$

where $\Omega=\Omega_a \oplus \Omega_b \oplus \Omega_c$ represents a compact and convex set. $\Omega_a$, $\Omega_b$, and $\Omega_c$ respectively represent compact and convex sets of a, b, and c. Solving the optimization problem in Equation (25) directly may not be straightforward due to the coupling Cb in Equation (20), which results in a nonlinear and nonconvex optimization. However, the separable structure of C and b allows for the usage of the separable least-squares technique. Fixing one parameter of Cb and solving optimization with respect to the other is convex, and this scheme leads to an iterative optimization approach. It can be shown that, even under weak conditions, this iterative identification scheme is convergent.

Another observation related to Equations (24)-(25) is the non-identifiability issue featured for Hammerstein models. This is due to the fact that any pair (b/l, lc) yields the same model, $\forall l \neq 0$. In order to address this problem, a normalization of b or c can be done in place. For open-loop Hammerstein models that can be transformed into separable linear least-squares forms, the iterative identification algorithm can guarantee convergence to stationary points, provided that a normalization is performed after each iteration.

An iterative identification algorithm for solving Equation (25) can therefore occur as follows. Denote the initial values of a and b as $\hat{a}^i$ and $\hat{b}^i$, respectively. Use $\hat{a}^k$ to denote the estimate of a in the $k^{th}$ iteration. The same notation is used for the values of b and c. Define the maximum iteration number as K. In each iteration k (where $k=1, \ldots, K$), fix the spatial parameter to $\hat{c}^{k-1}$ and perform a high-order ARX identification for Equation (13) by solving:

$$\{\hat{a}^k, \hat{b}^k\} = \arg\min_{a \in \Omega_a, b \in \Omega_b} V_N(a, b, \hat{c}^{k-1}) \qquad (26)$$

The above optimization is an ordinary least-squares problem, which is easy to solve. Before identifying spatial parameters, $\hat{b}^k$ can be normalized after solving Equation (26) as follows:

$$\rho_k = \text{sign}(\hat{b}^k(1)), \hat{b}^k = \rho_k \frac{\hat{b}^k}{\|\hat{b}^k\|} \tag{27}$$

This is done to eliminate parameter non-identifiability due to the coupling of b and c. After that, fix the temporal parameters to $\{\hat{a}^k, \hat{b}^k\}$ and estimate the spatial parameter in Equation (13) with another linear least-squares:

$$\hat{c}^k = \arg\min_{c \in \Omega_c} V_N(\hat{a}^k, \hat{b}^k, c) \tag{28}$$

The next iteration could then occur, and the same procedures are carried out.

The estimated parameters after K iterations are defined as $\hat{a}=\hat{a}^K$, $\hat{b}=\hat{b}^K$, and $\hat{c}=\hat{c}^K$. With that, $\hat{\theta}_N=[\hat{a}^T \hat{b}^T \hat{c}^T]^T$. Note that, to obtain an estimate for true temporal and spatial parameters, some extra identifications can occur. To this end, the input-output data can be filtered, such as by:

$$\tilde{y}(t)=A(q^{-1},\hat{a})y(t), \tilde{u}(t)=A(q^{-1},\hat{a})G(\hat{c})u(t) \tag{29}$$

Ideally, if $A(q^{-1},\hat{a})=A^o(q^{-1})$ and $G(\hat{c})=G^o$, it follows from Equations (1), (8), and (13) that $\tilde{y}(t)=g^o(q^{-1})\tilde{u}(t-d)$. It can be shown that $\hat{a}$ and $\hat{c}$ converge to the true parameter values asymptotically in the sample number N even under weak conditions. Thus, it is reasonable to estimate the temporal model $g^o(q^{-1})$ with filtered input $\tilde{u}(t)$ and filtered output $\tilde{y}(t)$. If a priori information about the true temporal model structure is available, a parsimonious model such as in Equation (12) can be efficiently estimated by an output-error identification. Otherwise, an FIR structure for the temporal model can be estimated to eliminate the bias. For a CD process, multiple-experiment output-error identification can be performed for $g(q^{-1},\theta_T)$ in Equation (12) as follows.

$$\tilde{y}(t)=g(q^{-1},\theta_T)\tilde{u}(t-d)+e(t) \tag{30}$$

Denote the parameter estimate as $\hat{\theta}_T=[\hat{h} \ \hat{1}]^T$. The next procedure is re-scaling the spatial and temporal parameters by:

$$\hat{c}=\hat{c}\hat{f}/(1-\hat{g}) \tag{31}$$

The rationale behind the re-scaling in Equation (31) is that $g(z^{-1},\theta_T)$ is discretized from a continuous first-order transfer function and has a unit step response at steady-state. With the acquired $\hat{c}$, the spatial parameter $\theta_S$ for Equation (3) can be easily identified by standard nonlinear least-squares. The entire algorithm for the closed-loop CD identification process is summarized in Table 1.

TABLE 1

Algorithm of closed-loop CD identification

| | |
|---|---|
| Input: | Set $\hat{a}^i \leftarrow a^i$, $\hat{b}^i \leftarrow b^i$, and $\hat{c}^i \leftarrow c^i$. K ← maximum iteration number. |
| Loop: | for k = 1, ..., K do: |
| 1: | Fix the spatial parameter $\hat{c}^{k-1}$, and estimate the parameters of the high-order ARX part in Equation (13) by solving the least-squares problem in Equation (26). |
| 2: | Normalize $\hat{b}^k$ as in Equation (27). |

TABLE 1-continued

Algorithm of closed-loop CD identification

| | |
|---|---|
| 3: | Fix the temporal parameters $\{\hat{a}^k, \hat{b}^k\}$, and estimate the spatial parameter in Equation (13) by solving the non-linear least-squares problem in Equation (28). |
| End for: | |
| 4: | $\hat{a} = \hat{a}^K$, $\hat{b} = \hat{b}^K$, and $\hat{c} = \hat{c}^K$. Filter the input-output data as in Equation (29). |
| 5: | Estimate the temporal model $g(z^{-1},\theta_T)$ with $\tilde{y}(t)$ and $\tilde{u}(t)$ by an output-error identification as in Equation (30). |
| 6: | Rescale $\hat{c}$ based on Equation (31) and identify the spatial parameter $\theta_S$ in Equation (3). |
| Output: | Parameter estimates $\hat{\theta}_S, \hat{\theta}_T, \hat{a}$ and noise covariance. |

Using this approach, it can be shown that even under weak conditions on the true system and selected model structures, the closed-loop iterative identification approach is convergent for any large N and the parameter estimate is consistent as N→∞.

CD Model-Plant Mismatch Detection with One-Class SVM

This section describes a classical two-class SVM and its one-class SVM variant, which is used in handling one-class separation. Application of the one-class SVM technique to CD model-plant mismatch detection is then described.

SVM is a well-known binary classification technique. The basic idea of SVM involves choosing a hyperplane in a data space to separate two distinct classes of data. However, for linearly separable data, there are an infinite number of hyperplanes that are able to discriminate between the two classes. The SVM therefore seeks to find the hyperplane that not only separates the two classes but also maximizes its distance to either class. Therefore, the SVM is essentially an optimal separating hyperplane in the sense of robustness by significantly reducing false classifications compared to other separating hyperplanes.

Suppose there is a set of training data $\{x_1, \ldots, x_l\}$, $x_i \in X \subset \mathbb{R}^r$ with corresponding (binary) labels $\{y_1, \ldots y_l\}$, where l stands for the number of data points. As the data values are grouped into two classes, for convenience use $y_i=1$ to denote the first class and $y_i=-1$ to denote the second class. Note that r is the dimension of the space X in which the training data is located. For the linearly separable case, the SVM training problem can be formulated as:

$$\min_{w,b} \frac{1}{2}\|w\|^2 \tag{32}$$

$$\text{s.t.} \ y_i(w^T x_i + b) \geq 1, i = 1, \ldots, l \tag{33}$$

where $w \in \mathbb{R}^r$ and $b \in \mathbb{R}$ represent the two parameters characterizing a hyperplane. The objective function in Equation (32) is the margin of the hyperplane $w^T x_i + b = 0$ with respect to either class. Notice that any scaling of the pair $\{w, b\}$ yields the same hyperplane, but the constraint in Equation (33) removes such ambiguity by restricting the pair $\{w, b\}$ to those making the functional margin equal be one. The above optimization problem is convex and admits a solution via solving its dual equivalence. Its dual problem can be expressed as follows:

$$\min_\alpha \sum_{i=1}^l \alpha_i - \frac{1}{2}\sum_{i=1}^l \sum_{j=1}^l \alpha_i \alpha_j y_i y_j \langle x_i, x_j \rangle \tag{34}$$

s.t. $\alpha_i \geq i = 1, \ldots, l$ (35)

$$\sum_{i=1}^{l} \alpha_i y_i = 0 \quad (36)$$

where $\alpha_i$ is the Lagrangian multiplier. The corresponding prediction function can be expressed as:

$$p(x) = \sum_{i=1}^{n} \hat{\alpha}_i y_i \langle x_i, x \rangle + \hat{b} \quad (37)$$

where $\hat{\alpha}_i$ and $\hat{b}$ are the obtained Lagrangian multiplier and offset.

It is easy to verify that the solution $\hat{\alpha}_i$ is sparse, and the $x_i$ values that correspond to nonzero $\hat{\alpha}_i$ are known as support vectors. The sparsity of $\hat{\alpha}_i$ can significantly simplify the predictions in Equation (37) as the summation involves fewer terms. Another advantage of using the dual formulation in Equations (34)-(36) of a two-class SVM is that both the dual objective function and the prediction function are in terms of inner products between training and/or test points. This enables the use of the kernel trick to SVMs in order to deal with nonlinear classifications. With the kernel trick, the inner product above is replaced by a kernel function. For linear non-separable classes of data in an original (or input) space, it may be possible to linearly separate them by mapping them up to a high-dimensional space, known as a feature space. The corresponding dual problem and prediction function are in terms of the inner product of points in the feature space. As the feature space is generally of high dimensions, the computation of inner product may not be particularly simple. However, the kernel function evaluates the inner product of points in the feature space by calculating a corresponding nonlinear function in the original space, so it avoids this computational issue. Moreover, an explicit function is no longer needed to complete that mapping if a kernel function is available.

With the dual form in Equations (34)-(36), slack variables can also be introduced to allow local violations of the boundary from the hyperplane, which is known as the C-SVM. This can be expressed as:

$$\min_{w,b,\zeta} \frac{1}{2}\|w\|^2 + C\sum_{i=1}^{n} \zeta_i \quad (38)$$

s.t. $y_i(w^T x_i + b) \geq 1 - \zeta_i, i = 1, \ldots, l$ (39)

$\zeta_i \geq 0, i = 1, \ldots, l$ (40)

where $\zeta_i$ (with i=1, ..., n) are nonnegative slack variables and C is a weight parameter to act as a compromise between maximizing the margin and minimizing the training errors. The method of solving this C-SVM is analogous to that of the standard SVM, and the kernel function can also be incorporated.

One variant of the C-SVM that is useful here is the one-class SVM, which can be used to detect an abnormality of a process. In many industrial processes, an operator needs to detect whether a system is operating in a normal mode or an abnormal mode by analyzing process data. However, the only process data that is available most of the time is for the normal mode. This is because there are numerous possibilities for abnormal situations, and thus it may not be realistic to have enough classes of data to represent all abnormal situations. In other words, there is often only one class of training data (routine operating data), and the objective is to use this limited data to detect if testing data belongs to training class. If not, it means that an abnormal mode (such as a model-plant mismatch) has occurred.

A category of one-class SVMs can be constructed in the feature space with $\Phi: X \to F \subset \mathbb{R}^s$, which maps the original data into a feature space F of dimension s (which is greater than r). Suppose a kernel function $\kappa(x_1, x_2)$ exists for such a mapping so that:

$$\kappa(x_1,x_2) = \langle \Phi(x_1), \Phi(x_2) \rangle, \forall x_1, x_2 \in X \quad (41)$$

One example kernel function that could be used is the Gaussian kernel, which is expressed as:

$$\kappa(x_1,x_2) = \exp(-\|x_1-x_2\|^2/c) \quad (42)$$

where c is a parameter that tunes the shape of the kernel function. With a Gaussian kernel, all data in the feature space is located in the same orthant since the inner product $\kappa(x_1, x_2)$ of any two points are nonnegative. A one-class SVM can use the origin as the second class, as opposed to all training examples that are considered the first class. As a result, the classical two-class SVM techniques apply to this scenario, except that now the operations are all in the defined feature space.

A one-class SVM with slack variables in the feature space can be represented as follows.

$$\min_{w,b,\zeta} \frac{1}{2}\|w\|^2 + \frac{1}{vl}\sum_{i=1}^{n} \zeta_i - b \quad (43)$$

s.t. $w^T x_i + b \geq 1 - \zeta_i, i = 1, \ldots, l$ (44)

$\zeta_i \geq 0, i = 1, \ldots, l$ (45)

where w and b represent the slope and offset of the hyperplane in the feature space. A tuning parameter $v \in [0,1]$ stands for the trade-off between maximizing the margin and minimizing local violations of the separating boundary, so v determines the upper bound of the fraction of outliers and the lower bound of the fraction of support vectors. Note that while Equations (43)-(45) arise in the defined feature space, they can be equivalently converted to the following dual problem.

$$\min_{\alpha} \frac{1}{2}\sum_{i=1}^{l}\sum_{j=1}^{l} \alpha_i \alpha_j \kappa(x_i, x_j) \quad (46)$$

s.t. $0 \leq \alpha_i \leq \frac{1}{vl}, i = 1, \ldots, l$ (47)

$$\sum_{i=1}^{l} \alpha_i = 1 \quad (48)$$

which is represented in the original space. Similar to two-class SVMs, the solution to Equations (46)-(48) is also sparse in $\alpha$. This facilitates computations for making predictions with the trained SVM model using the support vectors. The prediction score can be determined by:

$$p(x) = \sum_{i=1}^{n} \hat{\alpha}_i \kappa(x_i, x) - \hat{b} \quad (49)$$

For any given test point x, |p(x)| shows its distance to the separating hyperplane. The sign of h(x) can therefore be used to indicate whether x is classified into the original data set. If p(x)>0, it means that x can be treated as being within the same class as the original data. Otherwise, x can be classified as an outlier showing an abnormal behavior.

To apply a one-class SVM to the model-plant mismatch detection scheme, note that the above description describes the use of an FIR representation of the model structure for process and noise models when performing system identification. One advantage of this approach, compared to other parametric system identification, is that the concern of bias arising from an incorrect specification of model structures is no longer an issue. Moreover, the FIR form of these models can synthesizes the effects of all parametric mismatches into a single overall metric. This can be useful if the original model has high orders since any large offset of a single parameter from a nominal value may or may not have much influence on the overall behavior of a model. In this sense, the FIR form is a better characterization of a given model. One drawback of this approach is that it places more stringent requirements on the informativeness of closed-loop data, such as when the data is routine operation data. However, it can be shown that, for a generic CD process under very loose conditions, the closed-loop identifiability can be guaranteed even in the absence of any external excitations.

Using the closed-loop identification technique described above, it is possible to attain consistent parameter estimates for spatial, temporal, and noise models for a process. This serves as input to the SVM-based mismatch detection framework. For example, mismatch detection can be performed for each of these models (possibly simultaneously) over time to examine changes in the corresponding models. Note that while the following description focuses on the detection of mismatch in temporal models, the same approach could be used with spatial and noise models. The monitoring of the noise models can be done so that changes in noise do not raise a false alarm, while changes in spatial and temporal models may raise an alarm due to actual mismatch.

To train a one-class SVM, temporal models estimated from moving windows in training data can be used as training models, which are denoted $\{x_1, \ldots, x_l\}$ corresponding to the data points in Equation (44). Here, l is the number of moving windows in the training data set, and $x_i$ represents the FIR coefficients of one estimated temporal model from the $i^{th}$ moving window:

$$x_i = [\hat{x}_i^1 \ldots \hat{x}_i^{n_g}]^T \quad (50)$$

where $\hat{x}_i^k$ (with k=1, . . . , $n_g$) represents the $k^{th}$ FIR coefficient and $n_g$ represents the order. Applying the one-class SVM defined in Equations (43)-(48) to the training models $\{x_1, \ldots, x_l\}$ yields a resultant SVM model in Equation (49).

In principle, a larger training data set provides better descriptions of the cluster boundary for model estimates without mismatch. However, in practice, situations may be encountered where only very limited training data is available, such as when there are fast task transitions to meet customer demands or when there are slow processes with large sampling intervals. A typical example of this is a paper machine, which often has a relatively large sampling interval. A grade change (where production of a web transitions from one grade to another) often takes place on a weekly basis, as it is common to receive orders for different types of papers from customers every week. One remedy to overcome the issue of limited training data is to use historical data. However, this cannot be done if the historical data is not accessible or was not saved, which is fairly common in the papermaking industry.

One possible solution to this problem is to enlarge the training data by re-sampling according to the probability distribution of parameter estimates. To this end, a re-sampling technique can occur as follows. It has been shown that parameter estimates from a separable nonlinear least-squares method is Gaussian distributed (if the noise is Gaussian), and this can be extended to the iterative closed-loop identification algorithm with minor modifications. Based on this statement, rough estimators for the mean $\mu_k$ and variance $\sigma_k$ of each FIR coefficient $\hat{x}^k$ can be expressed as follows.

$$\hat{\mu}_k = \mu(\hat{x}_1^k, \ldots, \hat{x}_l^k), \hat{\sigma}_k = \sigma(\hat{x}_1^k, \ldots, \hat{x}_l^k), k=1, \ldots n_g. \quad (51)$$

where a common choice for $\mu(\bullet)$ and $\sigma(\bullet)$ are the sample mean and sample variance. If the number of training models is small (such as due to limited training data), the variance estimator in Equation (51) is conservative relative to that obtained from the true probability density function. A proper scaling factor $\alpha_T$ (the subscript T means temporal) of $\hat{\sigma}_k$ is used here. One potential rule of thumb in selecting $\alpha_T$ is to use a small value if there is a large amount of training data or a large value if there is a small amount of training data. A larger scaling factor may make the mismatch detection algorithm less sensitive to mismatch, while a smaller scaling factor may make the mismatch detection algorithm more sensitive to mismatch. After scaling the variance estimator, the obtained density function can be used to perform the re-sampling to generate a large number of training models, and a one-class SVM can be trained based on the augmented data.

Once the SVM is trained, the SVM is used for prediction purposes, namely to identify when additional models generated for the CD process are outside of the training data. Similar to the SVM training stage, the SVM prediction stage can use a moving window that slides along the testing data, where closed-loop identification is performed for each window. The trained SVM model is used to predict whether the currently-estimated model can be classified into the initial cluster of normal model estimates. For example, given the testing data point x (the FIR coefficient vector), p(x) computes the functional distance of this point to the initial cluster, and this distance is denoted as a score. The sign of the score can be used to classify x. Positive scores mean the underlying test points can be grouped into the initial cluster and thus show no mismatch. Otherwise, they are seen as mismatched models.

To express an example of this is greater detail, define $I_t$ as the sign of the score for the moving window at time t. Human operators in practice tend to be very cautious in raising a model-plant mismatch alarm since the subsequent closed-loop identification is often expensive. Therefore, a single negative score could be used to automatically raise an alarm, or a number of negative scores could be accumulated over a specified number of moving windows before raising a model-plant mismatch alarm. An accumulated metric could be defined as:

$$s_{MPM} := \frac{I_-}{n_T} \qquad (52)$$

where $I_- := \{I_i = -1 : i \in T_t\}$ with $T_t := \{t-n_T, t-1, t\}$. Here, the term $n_T$ (which could be user-defined) indicates that the last $n_T$ moving windows are used to compute $S_{MPM}$. In some cases, operators could specify a conservative threshold on $s_{MPM}$, such as 0.95, to be circumspect on raising a mismatch alarm.

Example results that could be obtained using this technique are shown in FIG. 7, which relates to dry weight measurements associated with a web of paper being manufactured. In FIG. 7, time is divided into three periods 702-706. Period 702 denotes a period of normal operation, period 704 denotes a period associated with altered noise, and period 706 denotes a period where model-plant mismatch actually exists. The period 702 transitions to the period 704 at a time 708 when the noise change begins, and the period 704 transitions to the period 706 at a time 710 when significant model-plant mismatch begins.

Lines 712-716 in FIG. 7 denote the outputs of the mismatch detection algorithm for the noise model, the temporal model, and the spatial model for the dry weight. As can be seen in FIG. 7, the line 712 starts with values that are generally around zero, but the values become large positive values in the interval preceding the noise change. The line 712 then has negative values after the noise change. The mismatch detection algorithm therefore successfully identifies the change in the noise model. However, as noted above, a mismatch in the noise model may not lead to the generation of a mismatch alarm. The identification of a mismatch in the noise model without a corresponding mismatch in the spatial or temporal model allows the mismatch detection algorithm to avoid a false alarm. Of course, in other instances, a mismatch in the noise model could raise an alert.

The line 714 experiences a sharp transition around the same time that the line 712 goes positive, but the line 714 remains above zero for the entire illustrated time periods 702-706. Thus, the mismatch detection algorithm is not detecting a significant mismatch between the temporal model and the actual process.

The line 716 experiences a sharp transition around the same time that the line 712 goes positive, but the line 716 generally remains above zero during the periods 702 and 704. During these times, the mismatch detection algorithm is not detecting a significant mismatch between the spatial model and the actual process. However, shortly after the time 710 when significant model-plant mismatch begins, the line 716 goes negative. At that point, the mismatch detection algorithm is detecting a significant mismatch between the spatial model and the actual process. The mismatch detection algorithm can therefore generate an alarm or take other suitable corrective action, such as initiating automatic model identification to identify a replacement spatial model. The same or similar actions could be taken in response to an identified mismatch involving the temporal model (and possibly the noise model).

Although FIGS. 5 through 7 illustrate example uses of model-plant mismatch detection for cross-directional process behavior monitoring, various changes may be made to FIGS. 5 through 7. For example, these figures are provided merely to illustrate example functions or results associated with the model-plant mismatch detection algorithm. Other uses or implementations of the model-plant mismatch detection algorithm are possible, and FIGS. 5 through 7 do not limit this disclosure to any particular use or implementation.

SUMMARY

This disclosure has presented a novel closed-loop identification technique that can provide consistent parameter estimates for CD processes, and this technique is applicable to routine operating data that lacks external excitations. For CD model-plant mismatch detection, the routine operating data is split into training data and testing data. The closed-loop identification technique can be implemented in moving windows over both the training data and the testing data. One-class SVM models are based on clusters of model estimates created using the training data. The SVM models are used to classify the model estimates for the models identified using the testing data. From the classifications, the algorithm is able to detect the presence of model-plant mismatch. This approach enables the monitoring of the changes in process and noise models separately, allowing the robust detection of mismatch involving the process models even in the presence of noise model changes.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    at least one memory configured to store operating data associated with operation of a cross-directional industrial process that is controlled by at least one model-based process controller; and
    at least one processing device configured to:
        during a training period, perform closed-loop model identification with a first portion of the operating data to identify multiple sets of first spatial and temporal models;
        identify clusters associated with parameters using a support vector machine to determine clustering of the model parameters, the support vector machine implements a kernel function that generates linear or nonlinear clustering of data by mapping original data into a space where a cluster boundary is identified and the support vector machine is used for binary classifications;
        during a testing period, perform closed-loop model identification with a second portion of the operating data to identify second spatial and temporal models;
        determine whether at least one parameter value of at least one of the second spatial and temporal models falls outside at least one of the clusters, comprises:
            determine a functional distance of a point representing a new model parameter to the at least one of the clusters associated with the second spatial and temporal models; and
            classify, based on the functional distance, whether the at least one parameter value is inside or outside the at least one of the clusters;
        in response to a determination that the at least one parameter value of at least one of the second spatial and temporal models falls outside at least one of the clusters, detect that a mismatch exists between actual and modeled behaviors of the industrial process; and
        generate an alarm to take a corrective action including initiation of a model identification process to identify a replacement spatial or temporal model.

2. The apparatus of claim 1, wherein, to perform the closed-loop model identification with the first or second portion of the operating data, the at least one processing device is configured to:
    iteratively:
        estimate one or more temporal parameters while one or more spatial parameters are fixed;
        normalize at least one of the one or more temporal parameters; and
        estimate the one or more spatial parameters while the one or more temporal parameters are fixed.

3. The apparatus of claim 2, wherein, to perform the closed-loop model identification with the first or second portion of the operating data, the at least one processing device is further configured to:
    filter the first or second portion of the operating data using the temporal and spatial parameters;
    estimate a temporal model using the filtered first or second portion of the operating data; and
    rescale the one or more spatial parameters based on the estimated temporal model.

4. The apparatus of claim 1, wherein, to determine whether the at least one parameter value of at least one of the second spatial and temporal models falls outside at least one of the clusters, the at least one processing device is configured to:
    map parameter values of the second spatial and temporal models into the higher-dimensional feature space using the support vector machine; and
    determine whether each parameter value of the second spatial and temporal models falls outside the at least one of the clusters by calculating the functional distance between a point representing that parameter value and the boundary of that cluster.

5. The apparatus of claim 4, wherein the support vector machine comprises a one-class support vector machine.

6. The apparatus of claim 1, wherein:
    the at least one processing device is configured to perform the closed-loop model identification with the first portion of the operating data multiple times using a sliding window within the first portion of the operating data; and
    the at least one processing device is configured to perform the closed-loop model identification with the second portion of the operating data multiple times using the sliding window within the second portion of the operating data.

7. The apparatus of claim 1, wherein:
    the at least one processing device is configured to perform the closed-loop model identification with the first portion of the operating data to identify first noise models;
    the at least one processing device is configured to perform the closed-loop model identification with the second portion of the operating data to identify second noise models; and
    the at least one processing device is further configured to determine that no mismatch exists between the actual and modeled behaviors of the industrial process in response to a determination that at least one parameter value of the second noise models falls outside a cluster associated with parameter values of the first noise models.

8. A method comprising:
    obtaining operating data associated with operation of a cross-directional industrial process that is controlled by at least one model-based process controller;
    during a training period, performing closed-loop model identification with a first portion of the operating data to identify multiple sets of first spatial and temporal models;
    identifying clusters associated with parameters using a support vector machine to determine clustering of the model parameters, the support vector machine implements a kernel function that generates linear or non-linear clustering of data by mapping original data into a space where a cluster boundary is identified and the support vector machine is used for binary classifications;

during a testing period, performing closed-loop model identification with a second portion of the operating data to identify second spatial and temporal models;

determining whether at least one parameter value of at least one of the second spatial and temporal models falls outside at least one of the clusters, comprises:
    determine a functional distance of a point representing a new model parameter to the at least one of the clusters associated with the second spatial and temporal models; and
    classify, based on the functional distance, whether the at least one parameter value is inside or outside the at least one of the clusters;

in response to a determination that the at least one parameter value of at least one of the second spatial and temporal models falls outside at least one of the clusters, detecting that a mismatch exists between actual and modeled behaviors of the industrial process; and generate an alarm to take a corrective action including initiation of a model identification process to identify a replacement spatial or temporal model.

9. The method of claim 8, wherein performing the closed-loop model identification with the first or second portion of the operating data comprises:
iteratively:
    estimating one or more temporal parameters while one or more spatial parameters are fixed;
    normalizing at least one of the one or more temporal parameters; and
    estimating the one or more spatial parameters while the one or more temporal parameters are fixed.

10. The method of claim 9, wherein performing the closed-loop model identification with the first or second portion of the operating data further comprises:
    filtering the first or second portion of the operating data using the temporal and spatial parameters;
    estimating a temporal model using the filtered first or second portion of the operating data; and
    rescaling the one or more spatial parameters based on the estimated temporal model.

11. The method of claim 8, wherein determining whether the at least one parameter value of at least one of the second spatial and temporal models falls outside at least one of the clusters comprises:
    mapping parameter values of the second spatial and temporal models into the feature space using the support vector machine; and
    determining whether each parameter value of the second spatial and temporal models falls outside one of the clusters by calculating the functional distance between a point representing that parameter value and the boundary of that cluster.

12. The method of claim 8, wherein:
performing the closed-loop model identification with the second portion of the operating data comprises performing the closed-loop model identification multiple times using a sliding window within the second portion of the operating data; and
detecting that the mismatch exists comprises detecting that the mismatch exists based on multiple instances of the at least one parameter value of at least one of the second spatial and temporal models falling outside at least one of the clusters.

13. The method of claim 8, wherein:
performing the closed-loop model identification with the first portion of the operating data further comprises identifying multiple first noise models;
performing the closed-loop model identification with the second portion of the operating data further comprises identifying multiple second noise models; and
the method further comprises determining that no mismatch exists between the actual and modeled behaviors of the industrial process in response to a determination that at least one parameter value of the second noise models falls outside a cluster associated with parameter values of the first noise models.

14. The method of claim 8, wherein the cross-directional industrial process comprises a plurality of actuators arranged across a width of a web of material being manufactured or processed.

15. A non-transitory computer readable medium containing instructions that, when executed by at least one processing device, cause the at least one processing device to:
obtain operating data associated with operation of a cross-directional industrial process that is controlled by at least one model-based process controller;
during a training period, perform closed-loop model identification with a first portion of the operating data to identify multiple sets of first spatial and temporal models;
identify clusters associated with parameters using a support vector machine to determine clustering of the model parameters, the support vector machine implements a kernel function that generates linear or non-linear clustering of data by mapping original data into a space where a cluster boundary is identified and the support vector machine is used for binary classifications;
during a testing period, perform closed-loop model identification with a second portion of the operating data to identify second spatial and temporal models;
determine whether at least one parameter value of at least one of the second spatial and temporal models falls outside at least one of the clusters, comprises:
    determine a functional distance of a point representing a new model parameter to the at least one of the clusters associated with the second spatial and temporal models; and
    classify, based on the functional distance, whether the at least one parameter value is inside or outside the at least one of the clusters;
in response to a determination that the at least one parameter value of at least one of the second spatial and temporal models falls outside at least one of the clusters, detect that a mismatch exists between actual and modeled behaviors of the industrial process; and
generate an alarm to take a corrective action including initiation of a model identification process to identify a replacement spatial or temporal model.

16. The non-transitory computer readable medium of claim 15, wherein the instructions that when executed cause the at least one processing device to perform the closed-loop model identification with the first or second portion of the operating data comprise:

instructions that when executed cause the at least one processing device to:
iteratively:
- estimate one or more temporal parameters while one or more spatial parameters are fixed;
- normalize at least one of the one or more temporal parameters; and
- estimate the one or more spatial parameters while the one or more temporal parameters are fixed;

filter the first or second portion of the operating data using the temporal and spatial parameters;

estimate a temporal model using the filtered first or second portion of the operating data; and rescale the one or more spatial parameters based on the estimated temporal model.

17. The non-transitory computer readable medium of claim 15, further containing instructions that when executed cause the at least one processing device to:

repeat the closed-loop model identification during multiple training periods and during multiple testing periods.

* * * * *